United States Patent
Kammermeier et al.

[11] Patent Number: 6,045,301
[45] Date of Patent: Apr. 4, 2000

[54] DRILL WITH COOLING-LUBRICANT CHANNEL

[75] Inventors: Dirk Kammermeier, Stein; Bernhard Borschert, Nürnberg, both of Germany

[73] Assignee: Kennametal Hertel AG Werkzeuge +Hartstoffe, Fuerth, Germany

[21] Appl. No.: 09/005,271

[22] Filed: Jan. 9, 1998

Related U.S. Application Data

[63] Continuation-in-part of application No. PCT/EP96/03083, Jul. 13, 1996.

[30] Foreign Application Priority Data

| Jul. 14, 1995 | [DE] | Germany | 295 11 430 U |
| Aug. 8, 1995 | [DE] | Germany | 295 12 745 U |
| Feb. 21, 1996 | [DE] | Germany | 296 02 997 U |

[51] Int. Cl.$^7$ ..................................................... B23B 51/02
[52] U.S. Cl. .......................... 408/57; 408/59; 408/230
[58] Field of Search ................. 408/57, 59, 227, 408/230; 407/11

[56] References Cited

U.S. PATENT DOCUMENTS

| 960,526 | 6/1910 | Erlandsen | 407/11 |
| 1,425,122 | 8/1922 | McKechnie et al. | |
| 2,411,209 | 11/1946 | Hall et al. | 408/57 |
| 2,816,464 | 12/1957 | Willingham | 408/59 |
| 3,037,264 | 6/1962 | Mossberg | 407/11 |
| 3,045,513 | 7/1962 | Andreasson | 408/59 |
| 3,368,257 | 2/1968 | Andreasson | 407/11 |
| 3,597,817 | 8/1971 | Whalley | 407/11 |
| 3,861,011 | 1/1975 | Nose et al. | 407/11 |
| 4,643,621 | 2/1987 | Fuller, Jr. et al. | 408/57 |
| 4,705,435 | 11/1987 | Christoffel | 407/11 |
| 4,762,444 | 8/1988 | Mena | |
| 5,382,121 | 1/1995 | Bicknell | 408/57 |

FOREIGN PATENT DOCUMENTS

| 0419428 | 3/1991 | European Pat. Off. . |
| 0482982 | 4/1992 | European Pat. Off. . |
| 0545826 | 6/1993 | European Pat. Off. . |
| 0768136 | 4/1997 | European Pat. Off. . |
| 2460172 | 2/1981 | France | 407/11 |
| 0446198 | 6/1927 | Germany . |
| 1049661 | 1/1959 | Germany . |
| 1289386 | 2/1969 | Germany . |
| 1552463 | 7/1970 | Germany . |
| 3104752 | 8/1982 | Germany . |
| 3233968 | 3/1984 | Germany | 408/59 |
| 3808707 | 10/1989 | Germany . |
| 4128028 | 2/1993 | Germany . |
| 93510 | 4/1988 | Japan | 408/59 |
| 671940 | 7/1979 | U.S.S.R. | 408/59 |
| 19371 | 9/1914 | United Kingdom | 408/59 |
| 15608 | 11/1915 | United Kingdom | 408/57 |
| 0984664 | 3/1965 | United Kingdom . |

OTHER PUBLICATIONS

Eine (alte) Technik wird neu aktiviert, Von Kurt Häuser, Technische Rundschau, Jun. 1990.
Bohrmeister Gühring 41, 28. Jahrgang Ausgabe 41/95.

*Primary Examiner*—Daniel W. Howell
*Attorney, Agent, or Firm*—Larry R. Meenan

[57] ABSTRACT

A drill is disclosed with a least one central channel for cooling-lubricant oil feed. The drill has a shaft with at least one flute extending in a spiral around the shaft axis. The oil, fluid, and gas is fed to the point of application of the drill through lateral outlet apertures which are joined to the at least one oil channel by connecting channels.

9 Claims, 19 Drawing Sheets

DRILL WITH COOLING-LUBRICANT CHANNEL

CONTINUING APPLICATION DATA

This application is a Continuation-In-Part Application of International Application No. PCT/EP96/03083, filed on Jul. 13, 1996, which claims priority from Federal Republic of Germany Application No. 295 11 430.4, filed on Jul. 14, 1995, Federal Republic of Germany Application No. 295 12 745.7, filed on Aug. 8, 1995, and Federal Republic of Germany Application No. 296 02 997.1, filed on Feb. 21, 1996. International Application No. PCT/EP96/03083, published as WO 97/03792 on Feb. 6, 1997, was pending as of the filing date of this application and designated the USA as a designated state.

BACKGROUND OF THE INVENTION

1. Field of the Invention

The present invention relates generally to a drill which has at least one fluid channel for the cooling and/or lubrication of the drilling process. In conventional drilling tools or drills, the coolant-lubricant oil is supplied by means of at least one fluid channel which is located in the drill. The fluid channel emerges externally by means of a discharge orifice in the flank of a major cutting edge. The cooling channel extends through the drill and can be supplied by means of a supply orifice in the end surface of the tool shank with coolant or more generally with a fluid which is suitable for cooling and/or lubrication during the drilling process. The coolant can be a fluid, a gas or a mixture of these substances.

2. Background Information

One disadvantage of known drills is that the fluid which is discharged from the flanks of the major cutting edges only reaches the actual site of the drilling, namely the major cutting edges, the minor cutting edges and the cut surfaces, as well as the faces or rakes and also the back of the drill. In particular on the major and minor cutting edges, the cutting and deformation work being performed generates a large amount of friction and consequently high temperatures. To ensure that sufficient fluid is available at these sites, correspondingly large quantities of fluids and high pressure are necessary. The use of large quantities of fluid also entails high costs for the disposal of the fluid.

Recently, a very great potential has been identified in dry machining. However, since not all cutting problems can be solved with 100% dry working, alternate approaches are also being considered which include micro-lubrication. This type of machining can frequently be considered quasi-dry machining, because the problems usually encountered during wet machining (coolant and lubricant oil supply, equipment costs, cleaning etc.) preferably do not occur.

As a rule, in these systems the lubricant (generally oil) is applied to the work site (drill bit, saw blade) by means of nozzles. During drilling, however, problems occur with this solution, because the lubricant can only be applied when the drill is outside the boring. If the lubricant were to be introduced through the spindle and through the drill, and an internally cooled drill were used, the problem could be solved somewhat more successfully. Here again, the problem arises that as a result of the long path of the lubricant, more lubricant is required simply to fill the lines than would be required to solve the problems strictly related to the chip removal. According to information from a manufacturer, approximately 100 ml per shift is required to lubricate a tool externally.

OBJECT OF THE INVENTION

The object of the present invention is to create a drill which eliminates the disadvantages of similar known drills and which is improved with regard to a reduced requirement for coolant and/or lubricant oil.

Another object of the present invention is therefore to feed the lubricant to the drill, via various borings in the drill, only at the point where it is actually required, and thereby to further significantly reduce the quantity of lubricant required.

An additional object of the present invention is a refinement of a drill with a coolant and/or lubricant supply which it carries along with it in its shank.

SUMMARY OF THE INVENTION

The present invention teaches that this object can be accomplished by a drilling tool which has in the lateral and peripheral surface of the blade, in an area in the vicinity of the drill tip, at least one discharge orifice. The at least one discharge orifice is hydraulically connected to the fluid channel and the flanks of the major cutting edges are free of such discharge orifices.

The present invention teaches that when a fluid is fed via discharge orifices in the lateral and peripheral surfaces of the blade or cutting part of a drill, the useful life of the drill can be increased. The borings made with such a drill are of good quality and the quantity of fluid required for cooling and/or lubrication is reduced in comparison to a known drill. The fluid is preferably supplied by at least one discharge orifice, which at least one discharge orifice is located in an area which extends from the drill tip in the direction of the drill shank over a length equal to twice the diameter of the drill or of the blade. A sufficient supply of fluid to the active drilling sites is guaranteed in this area. Preferably, however, one discharge orifice is located as close as possible to the actual site of application of the drill. Depending on the requirements of the specific situation with regard to the material being worked and the drilling power required, points of application, which points of application are subjected to particularly heavy strain, can be supplied with fluid by a corresponding positioning of the discharge orifices.

It is advantageous if one or more discharge orifices are located in the chip flute or chip groove. The chip flute or the base of the chip flute is an area which is of primary importance for the achievement of a smooth drilling action. The area of the chip flute which extends from the major cutting edge in the direction of the shaft is primarily designed to lift the chip from the material and to deflect it toward the back of the face. The face is therefore an area which is subjected to particularly high stress. Accordingly, in one preferred embodiment, one or more discharge orifices are located in the face. In contrast to the conventional location of discharge orifices in the flanks of the major cutting edges, when the discharge orifices are located in the face, the fluid is conducted directly to the point of application of the drill.

In an additional advantageous embodiment, the discharge orifices are located close to the area which is of decisive importance in the formation of the chip. This area is the area which can be immediately adjacent to the major cutting edges. Depending on the application, it is also advantageous if the discharge orifices are located in the vicinity of the minor cutting edges and, in particular, in the area of the face which is immediately adjacent to the minor cutting edges. In this case, therefore, the discharge orifices are located in an area of the drill which is relatively close to the corner of the blade. The fluid can therefore perform its function both on the major cutting edge and on the area of the minor cutting edge which is close to the corner of the blade.

By varying the positions of the respective discharge orifices, it becomes possible to adapt the drill to different cutting conditions. For example, in an additional advantageous configuration of the drill of the present invention, the discharge orifices are located on the back of the chip flute. This area is also of major importance for the chip formation. The radius of curvature of this area determines to a large extent the shape and the radius of curvature of a chip spiral. It is also an area which is subjected to particularly severe stresses when the drill is being used to drill pieces made of solid material which do not deform easily.

In an additional preferred embodiment of the drill of the present invention, there is at least one discharge orifice located in a minor flank or in a land or heel of the drill. It is also advantageous if there is at least one discharge orifice in the drill back which is adjacent to the land. The above-mentioned positions of the discharge orifices can of course be combined with one another, so that a drill as claimed by the present invention can be adapted for use in a wide variety of drilling tasks and with a wide variety of workpiece materials. While on conventional drills, a reduction in lubrication results in a significant reduction in performance, and, in particular, in a reduction of the useful life of the equipment, the drills taught by the present invention, in spite of the reduced quantities of fluid used, achieve long useful lives, which lives equal those of conventional drills on which drills significantly greater quantities of fluid are used during the drilling process.

There can theoretically be two possible ways to feed a fluid inside the drill. In one possible solution, inside the drill there is a central fluid channel, which fluid channel runs coaxial to the longitudinal axis of the drill. In a preferred embodiment, this fluid channel is connected to a funnel-shaped inflow opening. The inflow opening is located in the shank-side end surface of the drill and tapers toward the drill tip. As a result of this configuration, the flow conditions for the fluid inside the drill or inside a drilling tool can be improved.

In a second possible solution, corresponding to each chip flute there is a twisted or spiral fluid channel. Such a fluid channel extends at least in the vicinity of the blade of a drill. The fluid channel can correspond to the path of the chip flute, i.e. in a spiral shape, and can have the same direction of twist as the chip flute. In the manufacture of solid carbide drills, the twisted fluid channels are introduced using different fabrication methods. In drills manufactured in this manner, the fluid channels emerge at the flanks of the major cutting edges of the drill. The fluid channels or the discharge orifices, however, are subsequently closed, e.g. by using soldering material. The connection between the discharge orifice and a fluid channel is made by a connecting channel. This connecting channel is appropriately realized in the form of a boring. When the borings are introduced laterally, the above-mentioned connections are formed, by which connections the fluid can be fed to the respective areas of application. In this manner, conventional drills can be redesigned in a manner taught by the present invention with relatively little manufacturing effort or expense.

If there are a plurality of discharge orifices at one point of application, e.g. the face of the major cutting edge of a drill, it is advantageous if they are arranged in a row, which row runs or extends approximately along the longitudinal axis or in the direction of the chip flute. In such cases, but also in general in the case of a plurality of discharge orifices located in one point of application, it is appropriate if the diameter of the discharge orifices and the connecting channels decreases as the distance from the drill tip increases. This method can be used so that the fluid flow can be easily controlled. The smaller the diameter of the discharge orifices, the smaller the respective pressure drop in the fluid channel and the smaller the quantity of fluid discharged. Therefore, if the diameter of the discharge orifices farther from the tip is smaller, and the diameter of the discharge orifices closer to the tip is larger, the principal areas of application closer to the tip can be fed a larger quantity of fluid, and the areas of application farther from the tip, which areas are not subjected to as much strain, can be fed a correspondingly smaller quantity of fluid. Such a control of fluid quantities can be provided, in particular if, as taught by the present invention, there are one or more fluid channels inside the drill, which fluid channels are connected to the corresponding areas of application by subsequently-introduced connecting channels. The diameter of the connecting channels or of the corresponding discharge orifices can be varied as a function of the flow quantities required.

One advantage of the drill taught by the present invention is that only one size drill with a substantially standard or quasi-standard basic shape needs to be manufactured. The respective discharge orifices can then be introduced subsequently, as a function of the intended application, by a boring, which boring can have whatever diameter is appropriate. The connection channel formed by such a boring or its center longitudinal axis thereby preferably encloses an angle of 75–90 degrees with the longitudinal axis of the drill. The connecting channel, thus, runs or extends either at a right angle to the longitudinal axis of the drill or is inclined slightly by 15 degrees from this right-angle orientation. In other words, the connecting channel is then inclined at an angle of 15 degrees toward the tip of the drill or toward the shank of the drill. Such an orientation of the connecting channel guarantees that the peripheral areas of the discharge orifices still have sufficient stability. On the other hand, the present invention teaches that the angular orientation of the connecting channels indicated above reduces the incidence of failures and malfunctions with regard to clogging of the discharge orifices and the skewing of chips.

One possible embodiment of the present invention can relate to a solid carbide tool with one or more openings on the chip face and/or on the back of the drill. During the cutting process, gases, liquids or mixtures of gases and liquids can flow through these openings. On one hand, these accessory processing materials may cool the chips and on the other hand they may significantly reduce the transmission of heat from the chip to the tool flute. The reduced heating of the tool results makes it possible to achieve greater precision in the diameter of the boring, better surface properties and significantly reduced wear.

In a test of another possible embodiment of the present invention, approximately 400 borings into material Ck45 were made using one drill. The drill had one boring in each of the chip flutes, through which a mixture of air and oil was discharged. Without this boring in the chip flute, it would only be possible to achieve a maximum of 3–6 borings using an otherwise identical tool.

In yet another possible embodiment of the present invention, the openings in the chip flute and/or on the back of the drill provide a "cushion" which significantly reduces the transmission of heat from the chip to the tool. Thus it becomes possible to significantly increase the useful life of the tools.

In a further possible embodiment of the present invention, the drill can be manufactured from solid tungsten carbide. The reduction of tool heating achieved by the cooling and/or lubrication makes it possible to control the dimensions of the boring with greater precision, to achieve better surface characteristics and to reduce wear.

In still another possible embodiment of the present invention, to be able to continue to use conventional manufacturing methods with spiral channels for the manufacture of drills, the coolant discharge in the end surface of the drill manufactured according to the conventional methods can be closed, and the coolant can be discharged from a spiral cooling channel through branch channels introduced from the side in approximately the radial direction.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, wherein.

DESCRIPTION OF THE PREFERRED EMBODIMENT

Figure 13:
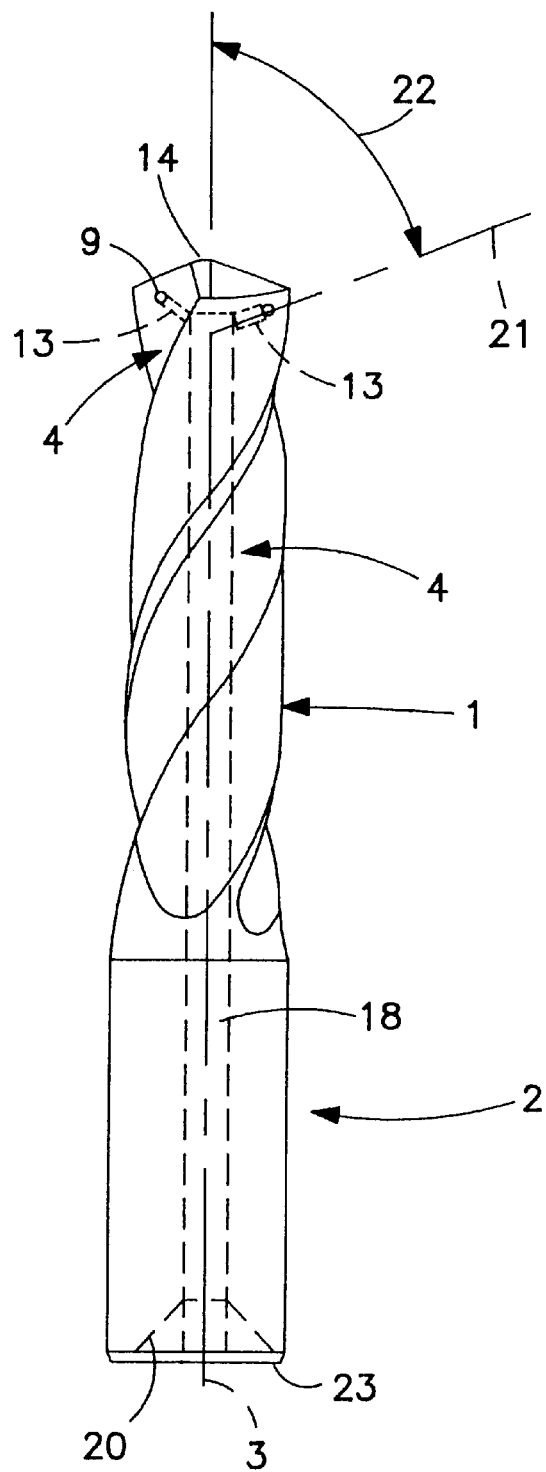
FIG. 13 is a side view of a drill with a central fluid channel.
Figure 14:
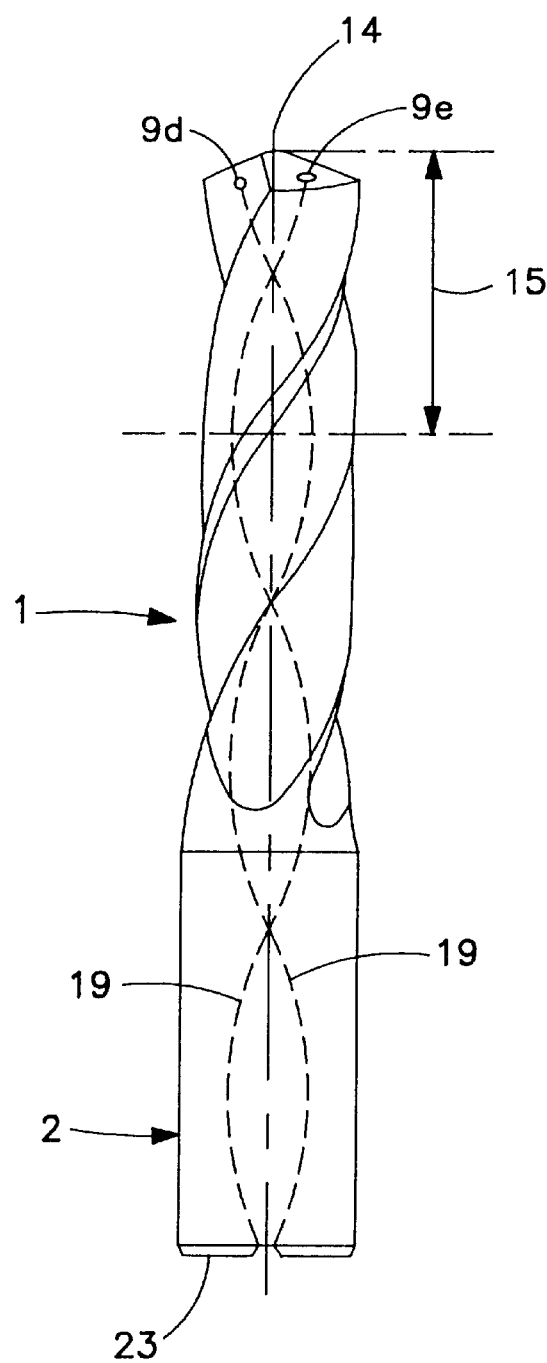
FIG. 14 illustrates a drill with two twisted fluid channels.
Figure 15:
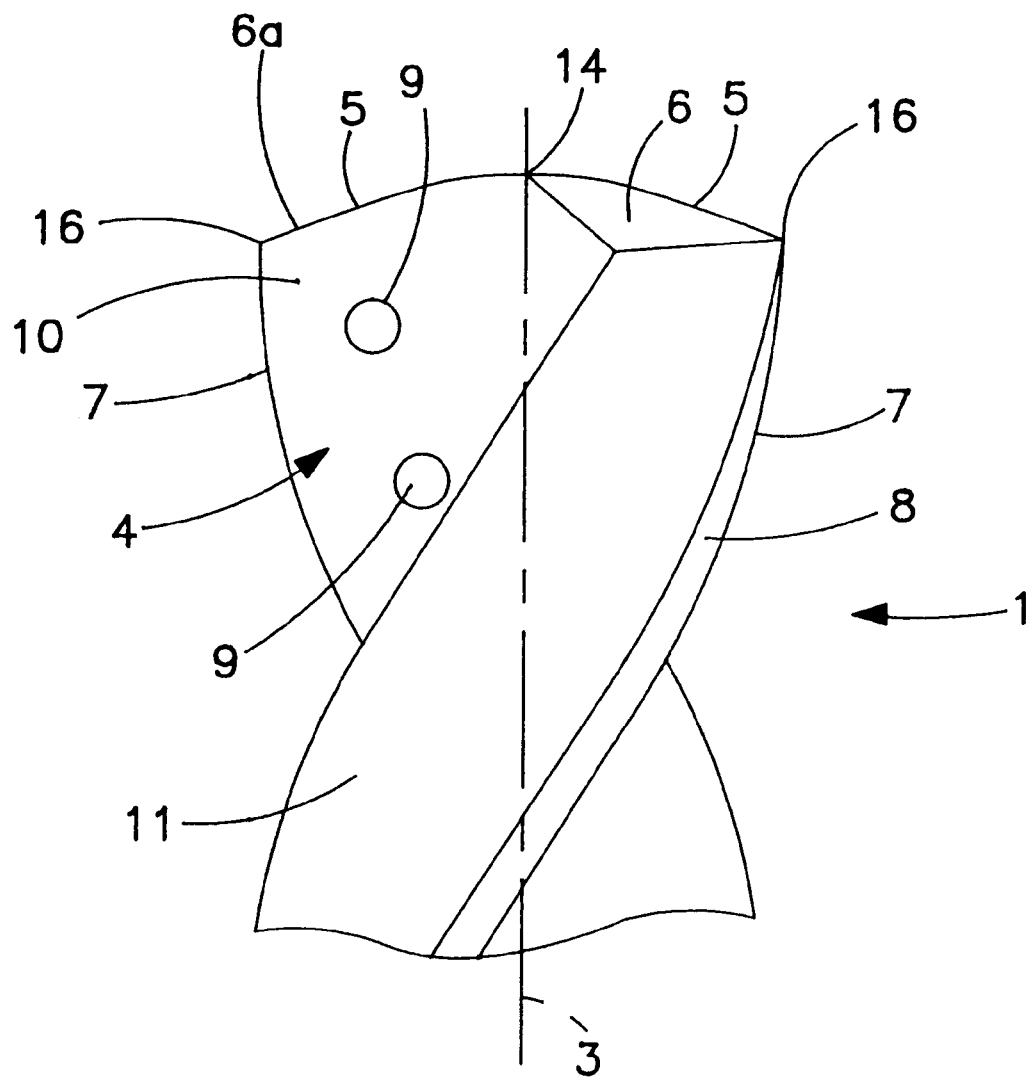
FIG. 15 illustrates additional features of the tip of the drill of FIG. 1.

The drills illustrated in the drawings, and as shown in FIGS. 13 and 14, can have the conventional characteristics of a twist drill, namely a blade 1, a cutting area or a drill shank 2, two chip flutes 4, which chip flutes 4 extend in spiral fashion around the longitudinal axis 3 of the drill, and two major cutting edges 5 (see FIG. 1) with the corresponding flanks 6, 6a (see FIG. 15). Each chip flute 4 is preferably also flanked by a minor cutting edge 7 (see FIG. 1) with a corresponding flank or land 8 (see FIG. 1).

Figure 1:
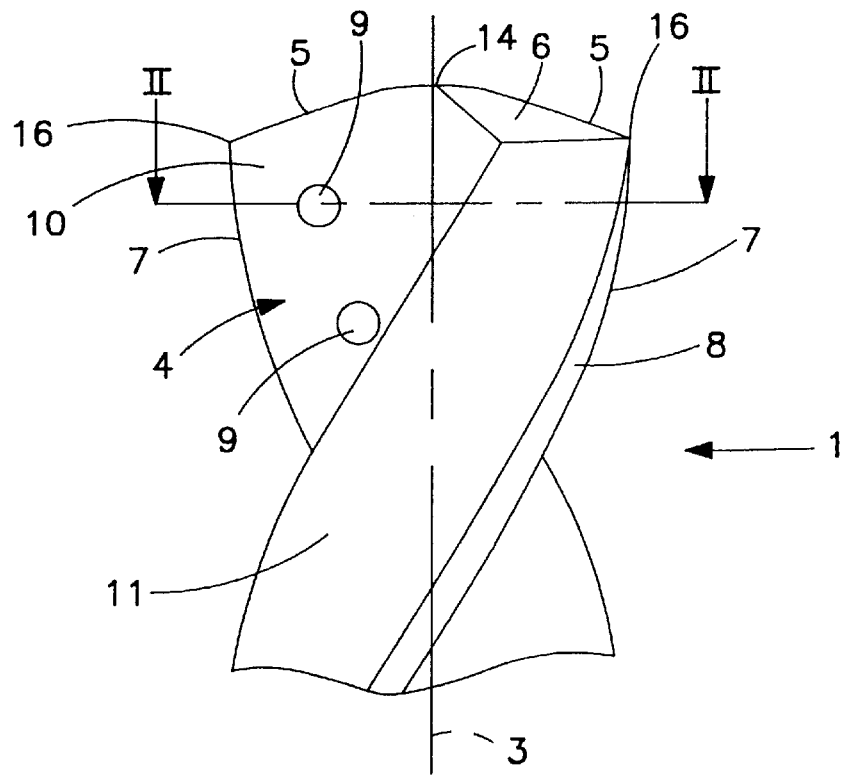
FIG. 1 is a side view of the vicinity of the tip of the drill, with discharge orifices in the face.

On the drill illustrated in FIG. 1, there are two discharge orifices 9 preferably located in a face 10. The discharge orifices 9 can lie on a line, which line extends approximately parallel to the path of the chip flute 4. The discharge orifices 9 in the embodiment illustrated in FIG. 1, like those in the drills illustrated in the other figures, are connected to the respective discharge orifices by a connecting channel or channels 13 (see FIG. 13). The connecting channels 13 can be formed by a boring introduced from the face 10. The discharge orifices 9 are generally located in an area which extends from the drill tip 14 toward the drill shank 2. The length 15 (see FIG. 14) of the area of the discharge orifices 9 can be equal to twice the diameter of the blade 1. In particular, in the case of a plurality of discharge orifices 9, which discharge orifices 9 correspond to one point of application, for example, one face, all of the discharge orifices 9 are preferably located in the above-mentioned area. This arrangement can guarantee that the fluid which acts as the coolant and lubricant is fed to the vicinity of the point of application, i.e. to the area of the tip of the drill 14 adjacent to the major cutting edges 5.

Figure 2:
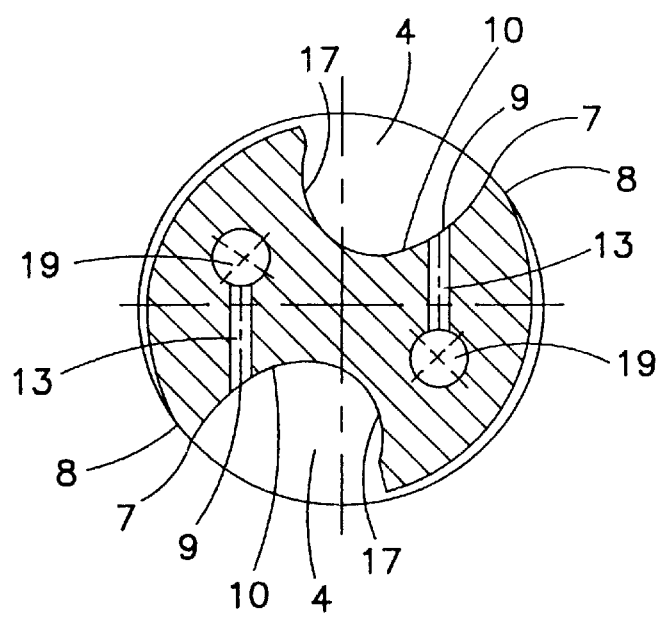
FIG. 2 is a schematic cross section along Line II—II in FIG. 1.

In another possible embodiment of the present invention, the discharge orifices 9 can be connected to a corresponding connecting channel 13. The connecting channel 13 can be used to supply coolant and lubricating fluid to the discharges orifices 9 and then to the point of application on the drill. FIG. 2 shows a cross-section of the drill of FIG. 1. FIG. 2 illustrates the connection between the connecting channels 13 and the discharge orifices 9.

Figure 5:
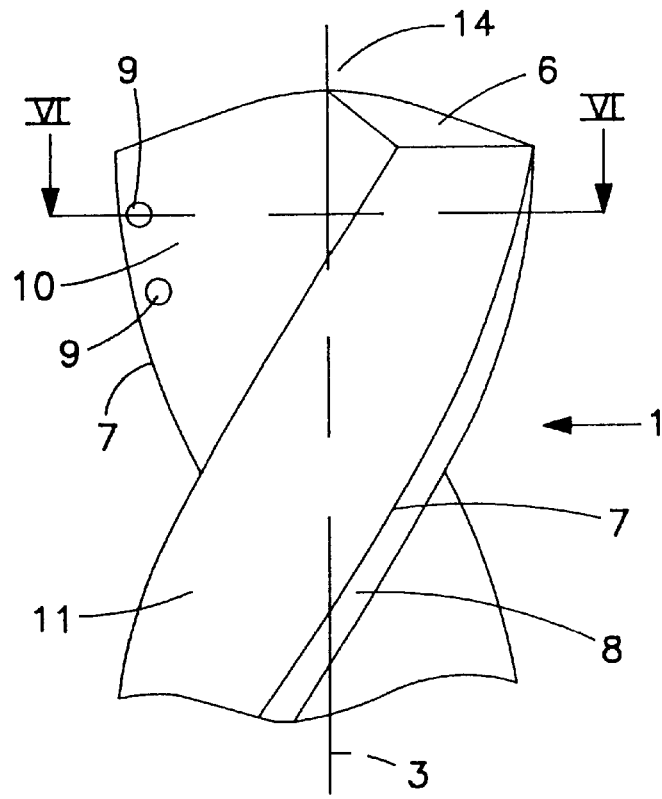
FIG. 5 illustrates an embodiment with discharge orifices located in an area of the face immediately adjacent to the minor cutting edge.
Figure 7:
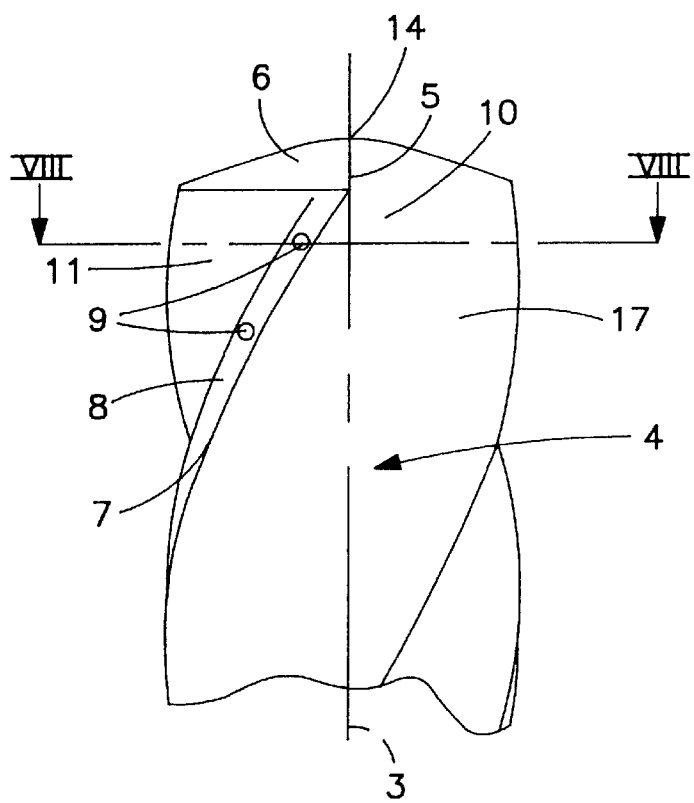
FIG. 7 illustrates an embodiment with discharge orifices in the land.

An additional possible positioning of the discharge orifices 9 is illustrated in FIG. 5. In this embodiment, the discharge orifices 9 are preferably located in an area of the face 10 immediately adjacent to the minor cutting edges 7. An additional variant is illustrated in FIG. 7. In this embodiment, the discharge orifices 9 can be located directly in the minor flanks and/or the land 8.

Figure 6:
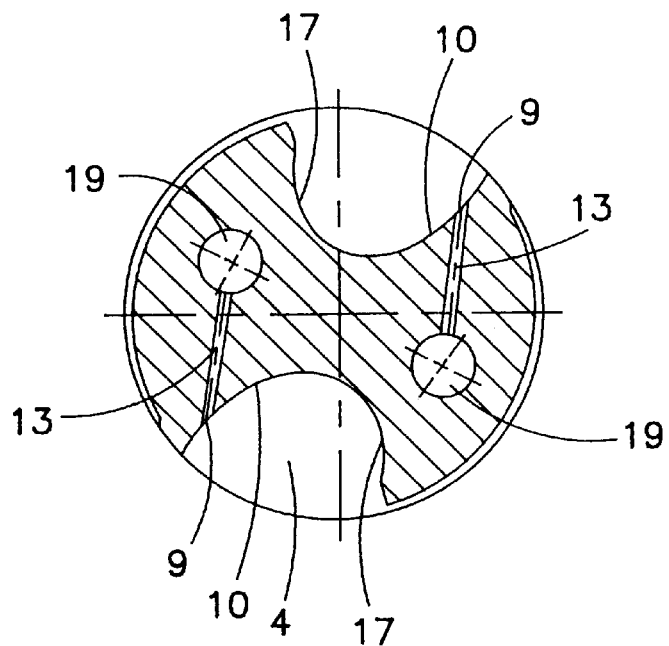
FIG. 6 is a schematic cross section along Line VI—VI in FIG. 5.

In another possible embodiment of the present invention, FIG. 6 shows a cross-section of the blade 1 of FIG. 5. FIG. 6 preferably shows the discharge orifices 9 in the area of the face 10 adjacent to the minor cutting edges 7 and the location of the connecting channels 13 connecting to the discharge orifices 9.

Figure 3:
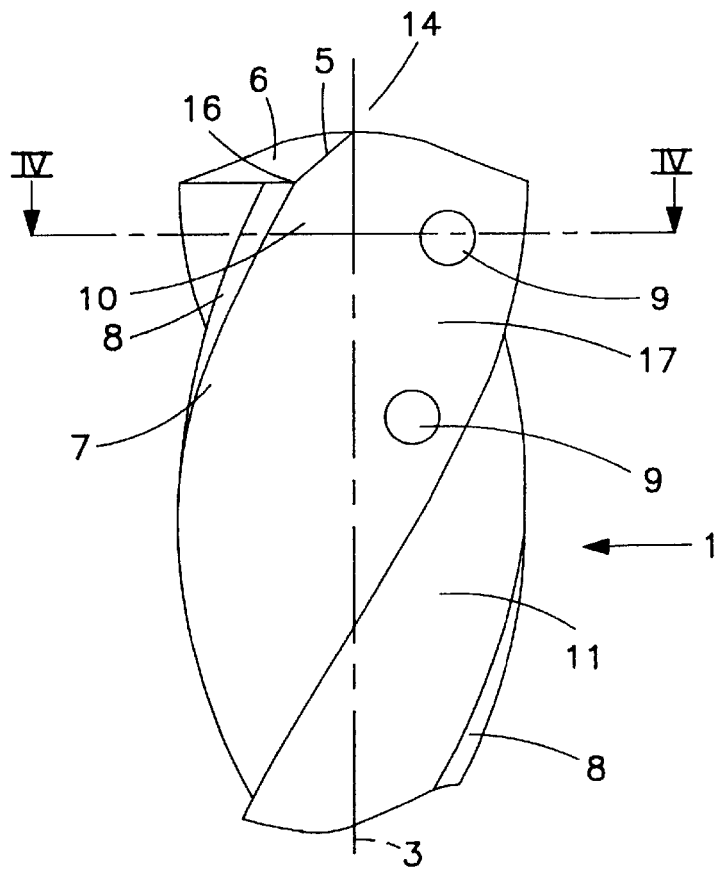
FIG. 3 illustrates one embodiment with discharge orifices in the back of the chip flute.
Figure 4:
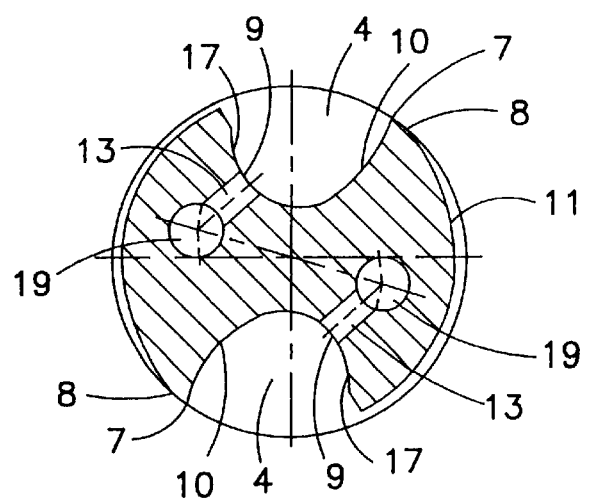
FIG. 4 is a schematic cross section along Line IV—IV in FIG. 3.
Figure 8:
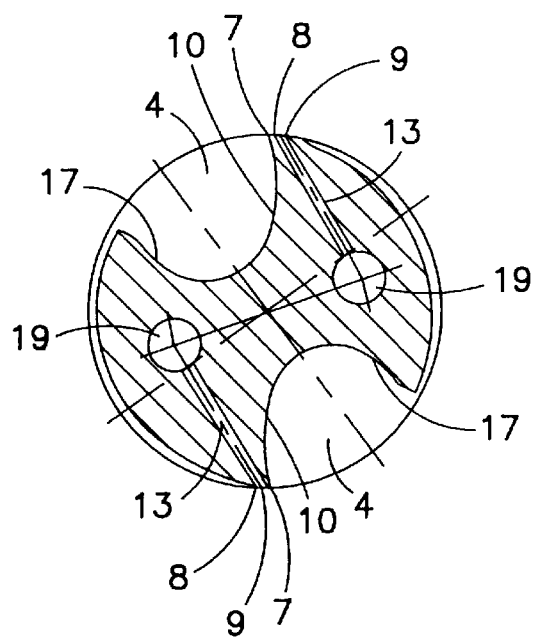
FIG. 8 is a schematic cross section along line VIII—VIII in FIG. 7.

FIGS. 3 and 4 illustrate an embodiment of the present invention in which there are a plurality of discharge orifices in the back 17 of the chip flute 4. In this embodiment, and in the embodiment illustrated in FIG. 5, the discharge orifices 9 are arranged in a row or on a line, which line approximately follows the path of the chip flute 4. The discharge orifices 9 in the embodiment illustrated in FIGS. 7 and 8 can also be arranged in a row or on a line, whereby the direction of the row or the path of the line follows the path of the land 8.

Figure 9:
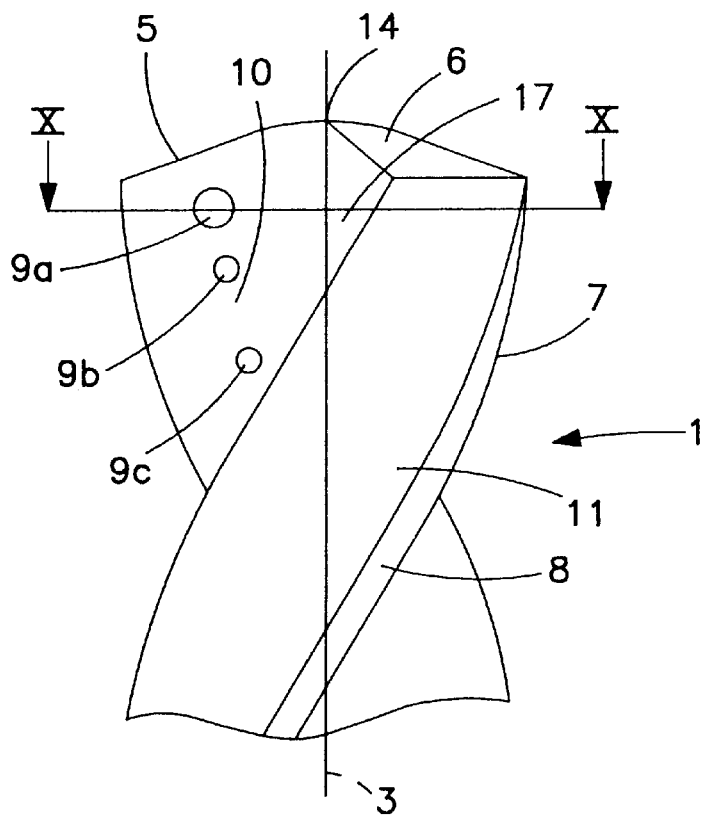
FIG. 9 illustrates an embodiment with discharge orifices of different diameters.
Figure 10:
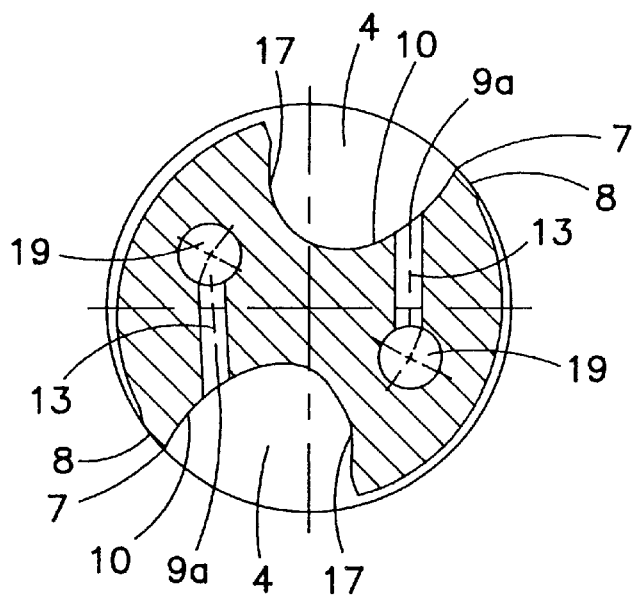
FIG. 10 is a schematic cross section along Line X—X in FIG. 9.

In the embodiment illustrated in FIGS. 9 and 10, there can be three discharge orifices 9a, 9b, 9c in the face 10. The discharge orifices 9a, 9b, 9c may be arranged on a curved line, which curved line approximately follows the path of the chip flute or groove 4. As a result of the different diameters of the discharge orifices 9a, 9b, 9c, it also becomes possible to control the respective quantity of fluid discharged. In general, the discharge orifice 9a located at the point of application of the major cutting edge 5 or in the vicinity of the corner of the blade 16 (see FIG. 1) will preferably have the largest diameter. Accordingly, the above mentioned areas, which areas require a greater quantity of coolant and lubrication, can be supplied with a sufficient quantity of fluid. The discharge orifices 9b and 9c, which discharge orifices 9b and 9c are located at increasing distances from the drill tip 14, have smaller diameters, as a result of which the quantity of fluid delivered is correspondingly reduced. In this manner, not only can the fluid be delivered in a controlled manner to the corresponding points of application, but the quantity can also be controlled and account can be taken, for example, of the fact that in the areas of the chip flute 4 which are at some distance from the tip 14, only small quantities of lubricant and coolant oil are required to make possible a proper chip removal.

Figure 11:
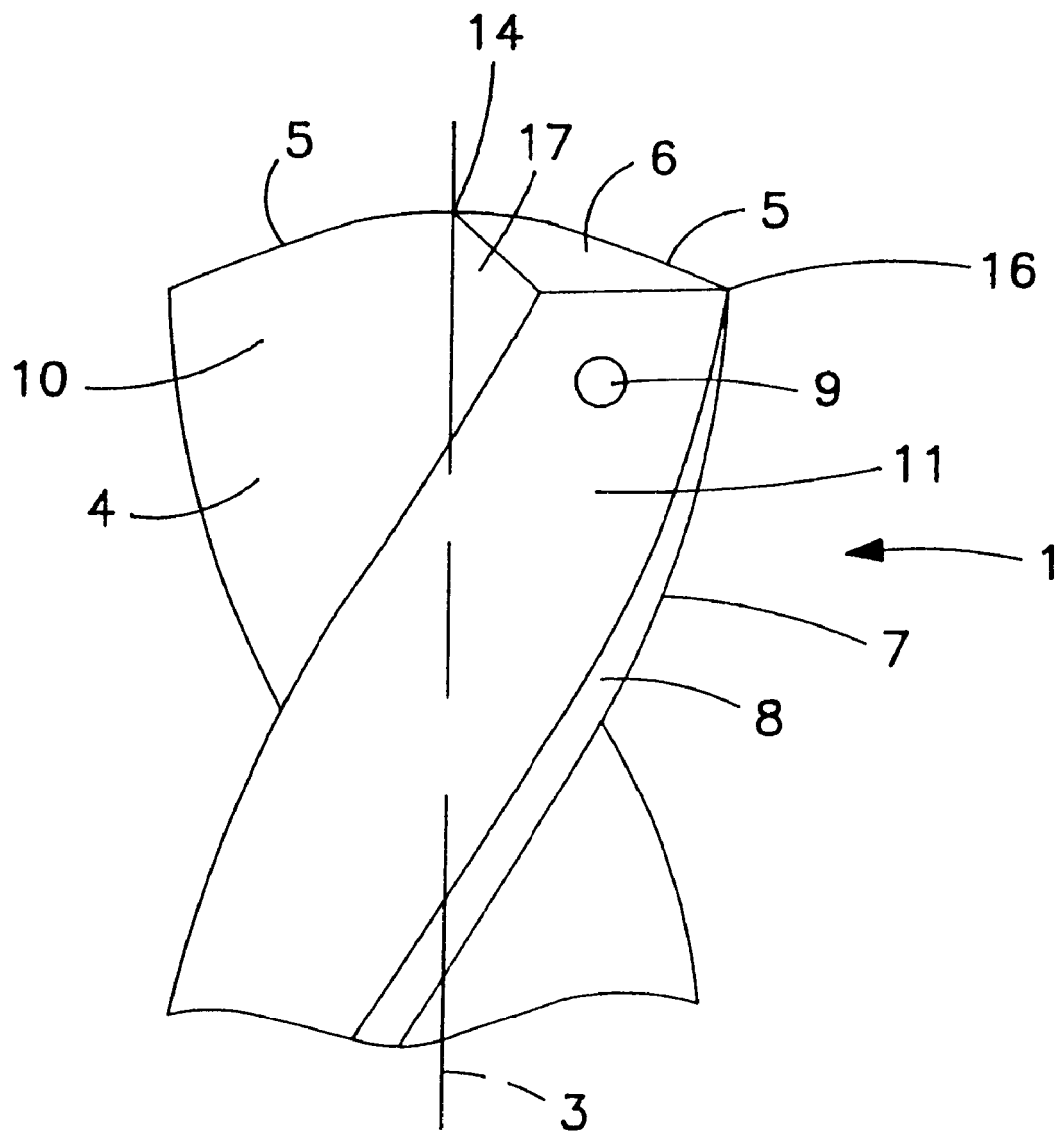
FIG. 11 illustrates an embodiment with a discharge orifice in the back of the drill.

An additional possibility for locating a discharge orifice 9 for the discharge of a fluid on a drill is illustrated in FIG. 11. In this embodiment, the discharge orifice 9 can be located on the back 11 of the drill and approximately centrally. The discharge orifice 9 can be located in an area adjacent to the flank 6. By means of such a drill, fluid can be conducted in a controlled manner for cooling and lubrication into the gap which occurs during drilling between the back surface of the drill and the wall of the drill hole.

Figure 12:
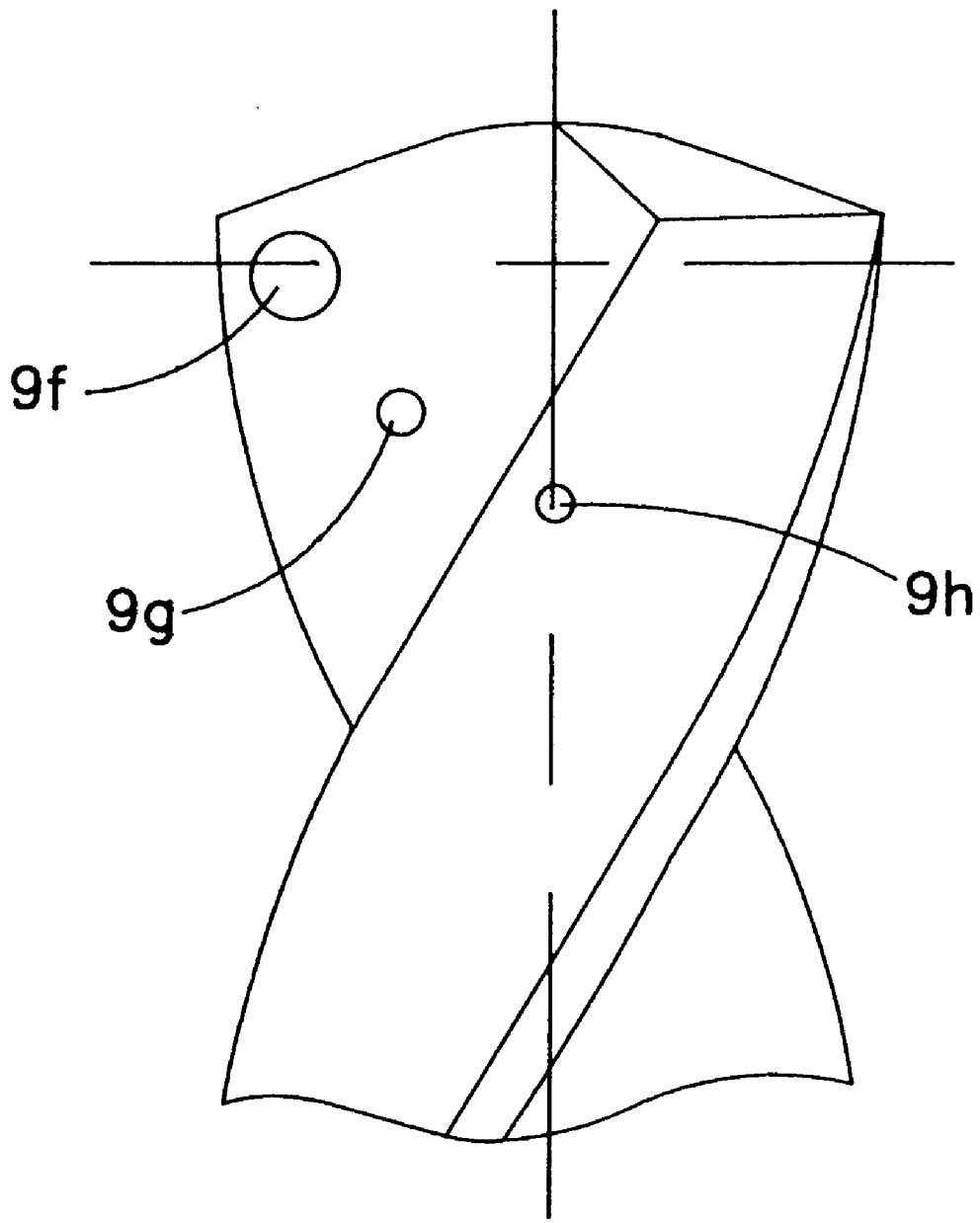
FIG. 12 illustrates an embodiment in which two discharge orifices are located in the face and one discharge orifice is located in the back of the chip flute.

FIG. 12 shows, by way of example, a drill which illustrates the possibility of combining the positionings of the discharge orifices 9 illustrated in the preceding embodiments with one another. A first discharge orifice 9f can be located in the area of the face 10 immediately adjacent to the minor cutting edge 7 and to the major cutting edge 5, i.e. in the vicinity of the blade corner 16 of the drill. A second discharge orifice 9g can be located at a greater distance from the drill tip 14 and approximately in the center of the face 10. Finally, a third discharge orifice 9h can be located on the back 17 of the chip flute 4. The two discharge orifices 9g and 9h preferably have smaller diameters than the discharge orifice 9f. When such a drill is used, the area of the blade edge, which area is subjected to a great deal of strain, can be supplied with an increased quantity of fluid. The adjacent area of the face 10, which face 10 controls the deflection of the chip toward the back of the chip flute 4, can be supplied with a reduced quantity of fluid by the discharge orifice 9g. The area of the chip flute 4, namely the back 17 of the chip flute 4, which area is adjacent to the above-mentioned area in the chip flow direction, can be supplied with a controlled quantity of fluid. The dispensed quantity of fluid can be controlled via the diameter of the discharge orifice 9h. The above mentioned discharge orifices 9f, 9g and 9h can lie on a line, which line runs or extends approximately in the direction of the chip removal.

FIGS. 13 and 14 illustrate the manner in which a fluid can be supplied to the discharge orifices 9 or to the connecting channels 13. The fluid can be supplied either through a central fluid channel 18 or through twisted fluid channels 19. The twisted fluid channels 19 can be present in a number which corresponds to the number of chip flutes 4. The central fluid 94 channel 18 of the drill illustrated in FIG. 13 extends through the entire drill and ends blind at some distance from the drill tip 14. The shank-side end of the central fluid channel 18 preferably emerges into a funnel-shaped inflow opening 20, which inflow opening 20 tapers toward the drill tip 14. The fluid channel 18, as noted above, is connected to the discharge orifices 9 by connecting channels 13. In the drill illustrated in FIG. 14 there are two fluid channels 19, which fluid channels 19 extend through the drill and have a spiral shape. The spiral shape of the twisted fluid channels can correspond to the path of the chip flute 4. The fluid channels 19 can each emerge in an opening (not shown) in the end surface 23 of the drill shank 2. For reasons preferably having to do with the manufacturing methods employed, the fluid channels 19 emerge in discharge orifices 9d and 9e in the flanks 6. The discharge orifices 9d, 9e, however, are preferably closed and are therefore, inactive. The fluid supplied by the fluid channel 19 can therefore be guided to the point of application of the drill during the drilling process not by the flanks 6, but by connecting channels 13 (not shown in FIG. 14) and corresponding discharge orifices 9a, approximately as illustrated in FIG. 10.

The connecting channels 13 are preferably oriented with respect to the longitudinal axis 3 of the drill, so that the connecting channels 13 enclose an angle 22 of 75–90 degrees. The discharge channels 13 illustrated by way of example in FIG. 13 are preferably inclined toward the drill tip 14. The central longitudinal axis 21 of the discharge channels 13 can form an angle 22 in the range of 75–90 degrees with the longitudinal axis 3 of the drill.

Figure 16:
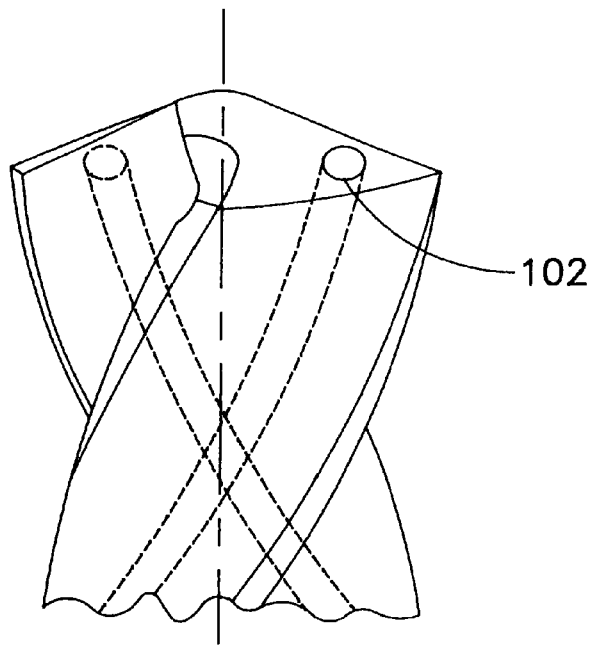
FIG. 16 illustrates a drill of the known art.
Figure 17:
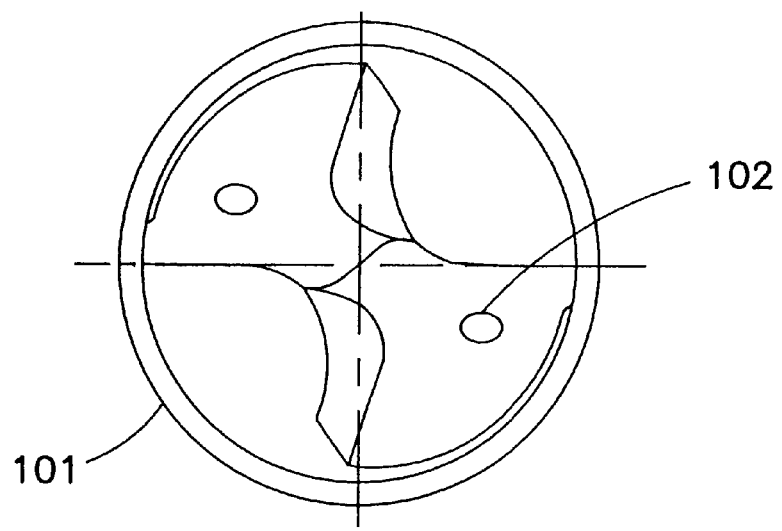
FIG. 17 shows a front view of FIG. 16.

FIG. 16 shows a drill of the known art. The mouth of the cooling channels 102, which cooling channels 102 spiral around the chip flute, can be in the end surface of the drill or in the flanks of the drill cutting edges. The workpiece 101 of the drill can be shown in FIG. 17.

Figure 18:
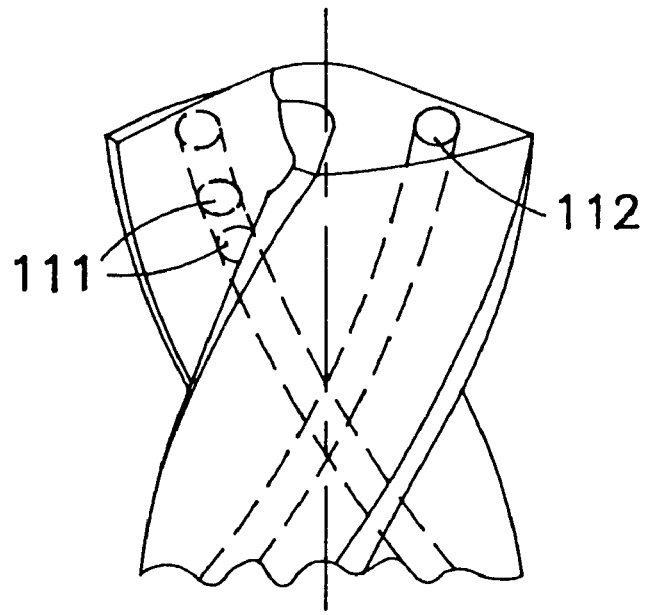
FIG. 18 illustrates a drill with openings in the chip flute and with the cooling holes at the flanks being closed.
Figure 19:
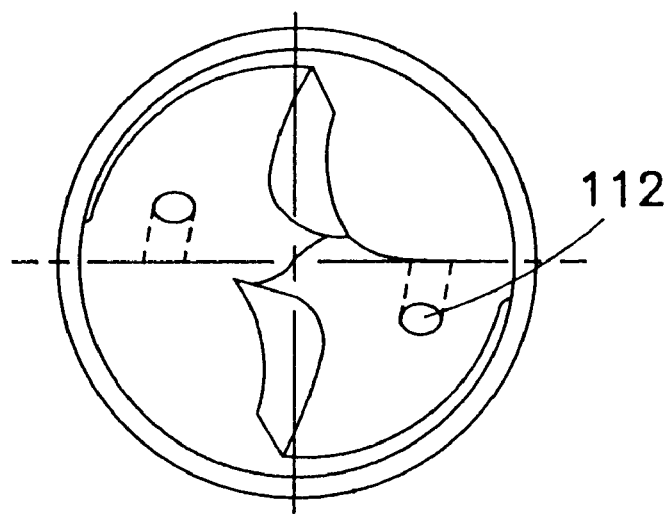
FIG. 19 shows a front view of FIG. 18.

In one possible embodiment of the present invention as shown in FIG. 18, the openings 111 can be located in the chip flute. The cooling channels are possibly blocked or closed as shown at 112. FIG. 19 shows a cross-sectional view of FIG. 18.

Figure 20:
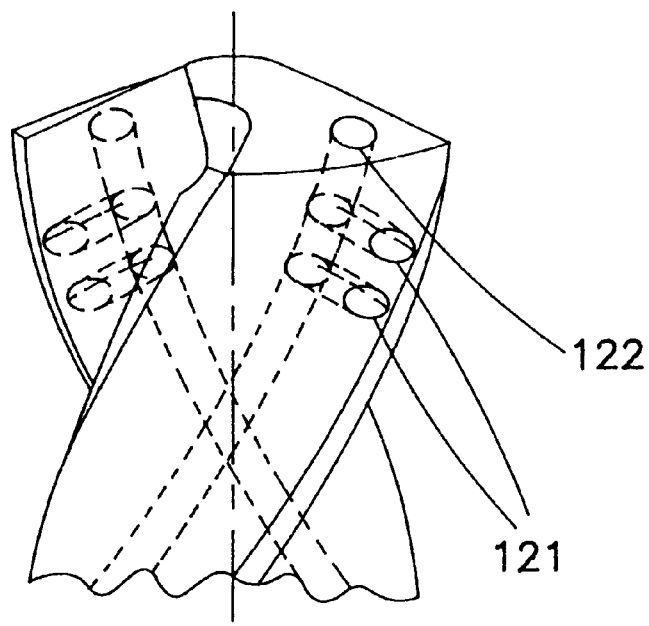
FIG. 20 illustrates a drill with openings in the back of the drill and with the cooling holes at the flanks being closed.
Figure 21:
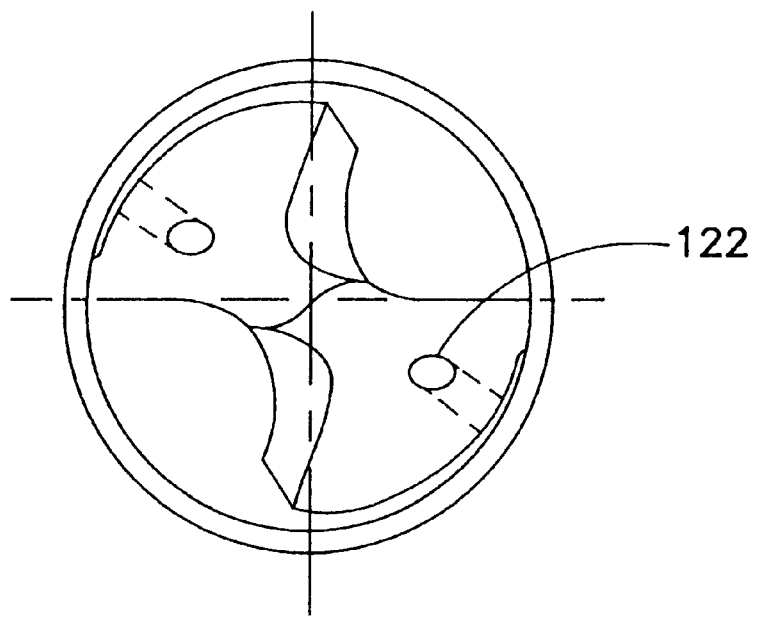
FIG. 21 shows a front view of FIG. 20.

In another possible embodiment of the present invention as shown in FIG. 20, the openings 121 can be located in the chip flute. The cooling channels are possibly blocked or closed as shown at 122. FIG. 21 shows a cross-sectional view of FIG. 20.

Figure 22:
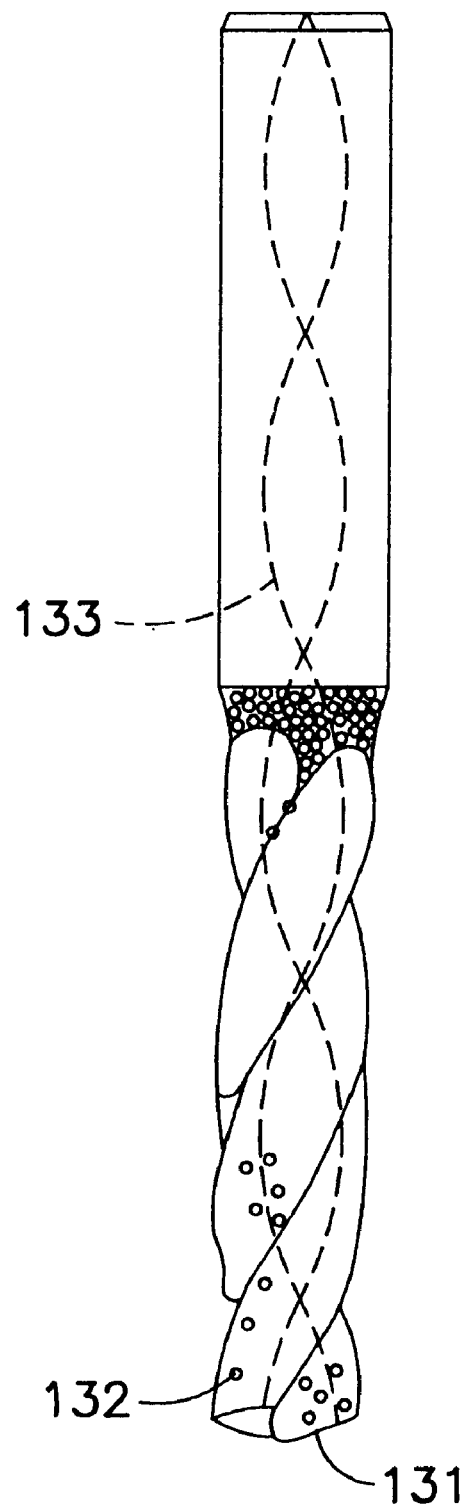
FIG. 22 illustrates one embodiment of the present invention.

In still another possible embodiment of the present invention as shown in FIG. 22, the drill can have openings 131 in the chip flute and openings 132 in the back of the drill. The lubricant or fluid can be supplied to the openings 131, 132 by a cooling or coolant channel 133. The lubricant can be supplied to the tool by means of a conventional coolant supply. The coolant is discharged via openings 131 in the chip flute and openings 132 on the back of the drill. Another way lubricant can be supplied to the tool is by means of a micro-lubrication device, like the ones offered by several manufacturers.

In another possible embodiment of the present invention, one refinement of this method would be to manufacture a drill which practically carries its own lubricant along with it, in the manner of a little reservoir, and discharges the lubricant only when it is required for cutting. That would make complex and expensive pumps and dosing systems—like those currently required—unnecessary to cool and lubricate cutting tools.

Figure 23:
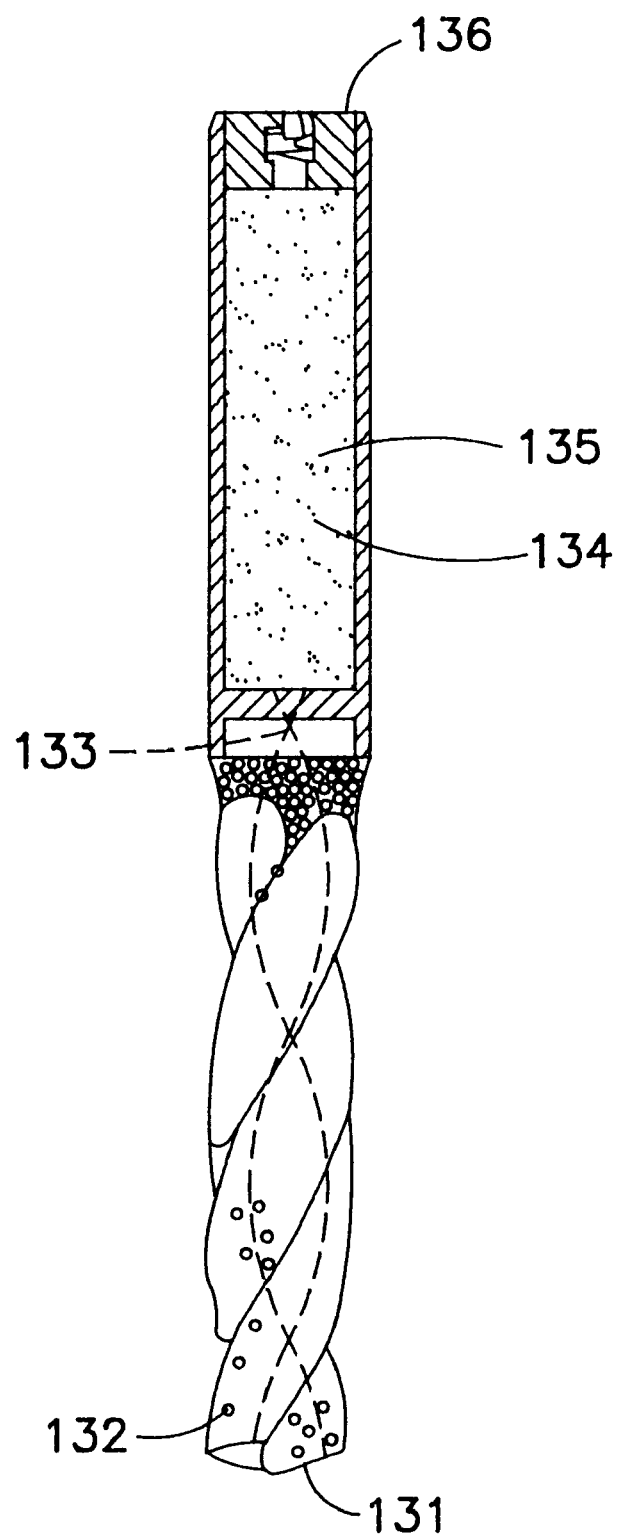
FIG. 23 illustrates one possible way to supply fluid to the drill.

In still another possible embodiment of the present invention as shown in FIG. 23, the drill can have a notch 134 for lubricant 135. The lubricant 135 can possibly be refilled into the notch 134 by the refill valve 136. This embodiment of the present invention can provide for a supply of lubricant in the drill, which lubricant 135 is discharged in the vicinity of the chip flute and the back of the drill only when the tool is rotating (centrifugal force), or when the viscosity of the lubricant 135 decreases as a result of the heating of the tool and the lubricant 135 is discharged through the borings 131, 132.

Figure 24:
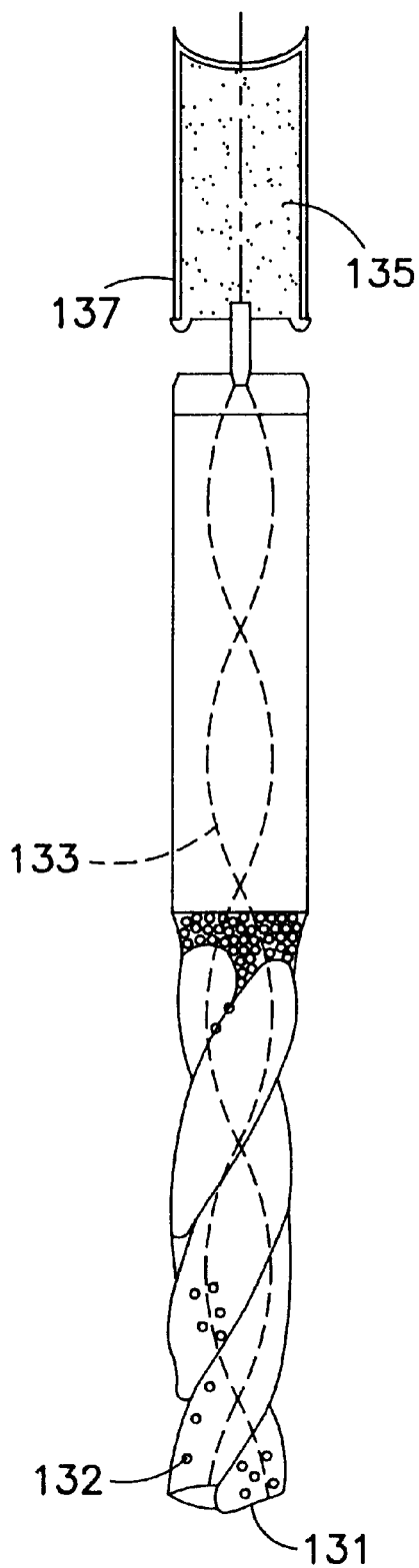
FIG. 24 illustrates another possible way to supply fluid to the drill.

In still another possible embodiment of the present invention as shown in FIG. 24, the drill can have a reservoir 137 for lubricant 135. This embodiment of the present invention works according to the same principle as the embodiment of FIG. 23, i.e. that a reservoir 137 which contains the lubricant 135 is docked on the tool. Further, it might also be possible to use a hydraulic medium such as those used in conventional spray cans.

Figure 25:
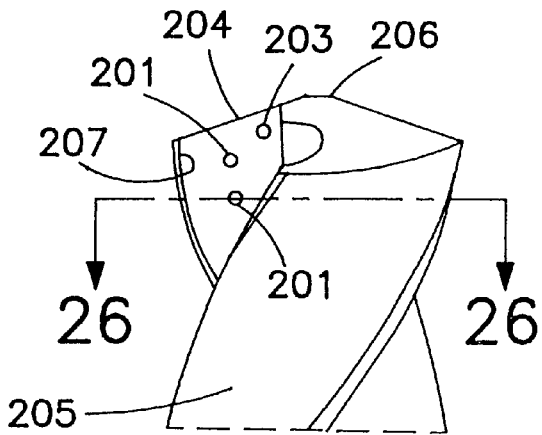
FIG. 25 illustrates a side view of a drill tip with a special positioning of a coolant channel discharge.

In still yet another possible embodiment as illustrated in FIG. 25, at least one or more discharge orifices 201 of spiral cooling channels 202, which cooling channels 202 are introduced in a known manner into the drill, can be positioned on the chip face 203 of the cutting edge 204. At a greater distance from the cutting edge 204 of the drill, instead of the chip face 203, we speak of the drill breast.

As illustrated in FIG. 25, the at least one discharge orifice 201 can be a plurality of discharge orifices 201, which discharge orifices 201 are lined up in a row approximately in the direction of the drill axis 205 or the path of the chip flute. The discharge orifices 201 can be concentrated in the area which is at a distance from the drill tip 206, which area is a maximum of twice the diameter of the drill. The orifice 201 can be inclined toward the drill tip 206 or toward the end of the drill opposite the drill tip 206.

Figure 26:
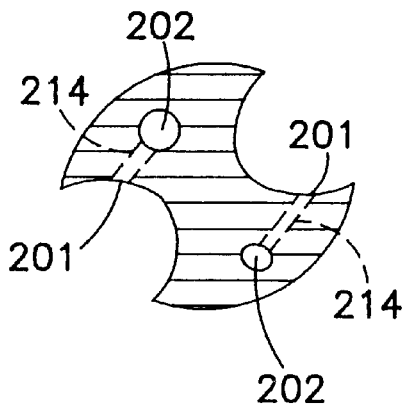
FIG. 26 illustrates a schematic view in cross section along Line 26—26 in FIG. 25.

In another embodiment of the present invention as illustrated in FIG. 26, the connection of branch channels 214 to the cooling channels 202 is preferably shown.

Figure 27:
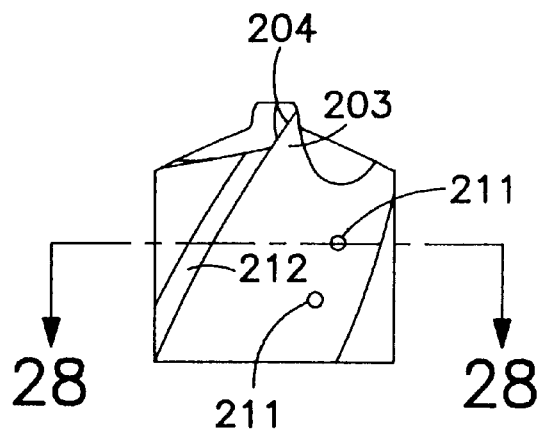
FIG. 27 illustrates a variant of the drill tip with a discharge of the coolant channel in the vicinity of the back of the chip flute.

In another possible embodiment as illustrated in FIG. 27, discharge orifices 211 are preferably located on the back 212 of the chip flute 213. Otherwise, the remarks relating to FIGS. 25 and 26 apply as appropriate to this variant embodiment.

Figure 28:
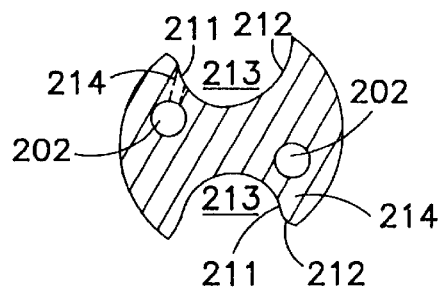
FIG. 28 illustrates a cross section along Line 28—28 in FIG. 27.

In another embodiment of the present invention as illustrated in FIG. 28, the connection of the branch channels 214 to the cooling channels 202 is preferably shown.

Figure 29:
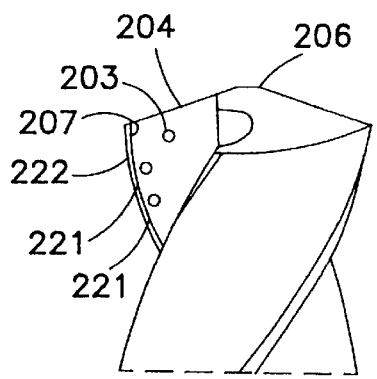
FIG. 29 illustrates an additional variant of a drill tip in a side view.

The possible embodiment illustrated in FIG. 29 is a variant of the embodiment illustrated in FIGS. 25 and 26. In this case, discharge orifices 221 also emerge in the drill flank 203 or in the drill breast. These orifices 221, however, emerge in the vicinity of the flank of the heel 222 of the minor cutting edge 207. Otherwise, the comments made above in relation to FIGS. 25 and 26 also apply to the basic realization of the drill.

Figure 30:
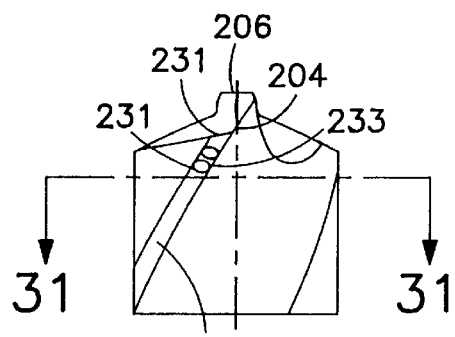
FIG. 30 illustrates a drill tip with a further variant.
Figure 31:
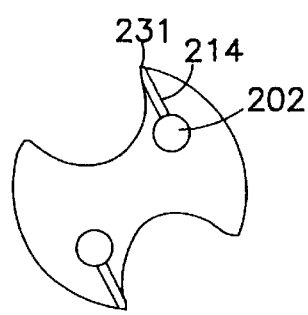
FIG. 31 illustrates a cross section along Line 31—31 in FIG. 30.
Figure 32:
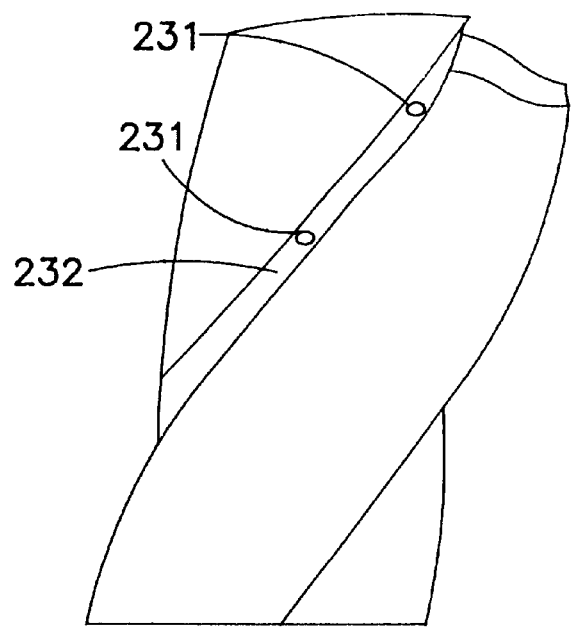
FIG. 32 illustrates a drill tip similar to the one illustrated in FIG. 30.

In the embodiment illustrated in FIG. 30, the discharge orifices 231 emerge in the heel 232 of the minor cutting edge 233. The heels 222, 232 are areas of the drill shank which are subjected to particularly high stresses, because they are in direct contact with the wall of the hole being drilled. The variant embodiment illustrated in FIGS. 30 and 31 is illustrated in additional detail in FIG. 32.

Figure 33:
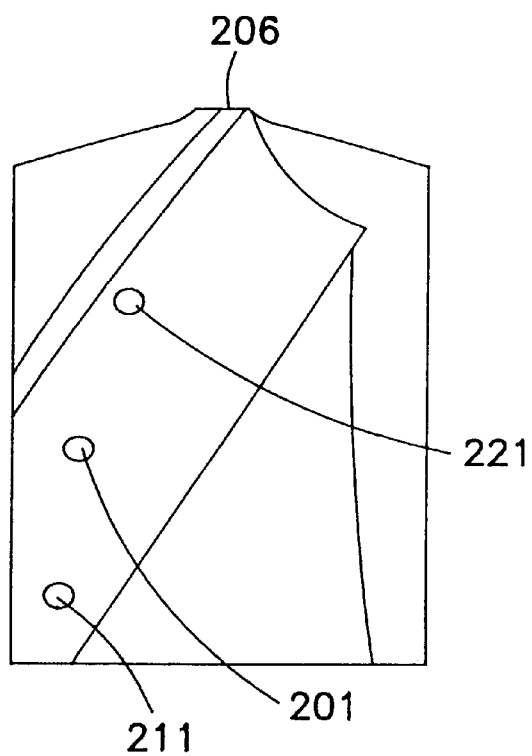
FIG. 33 illustrates a drill tip similar to the one illustrated in FIG. 29, with a plurality of openings of a coolant channel, and the different diameters of these openings.

FIG. 33 to some extent represents a variant which combines the features of the embodiments illustrated in FIGS. 25–29. The discharge orifice 201 which is closest to the drill tip 206 can be approximately like the one in FIG. 29. The next discharge orifice 221 in the direction away from the drill tip 206 can be an orifice like the one illustrated in FIGS. 25 and/or 26, and the next discharge orifice 211 can be like the ones illustrated in FIGS. 27 and/or 28. In the embodiment illustrated in FIG. 33, a discharge orifice 211 or 201 closer to the drill tip 206 can have a significantly larger diameter than a discharge opening 211 which is farther from the drill tip 206. It thereby becomes possible to control the amount of fluid discharged from the orifice. This effect takes advantage of the pressure decrease which occurs in the cooling channel 202.

An additional variant comprises different combinations of the coolant discharge orifices in relation to all of the variants explained above.

Figure 34:
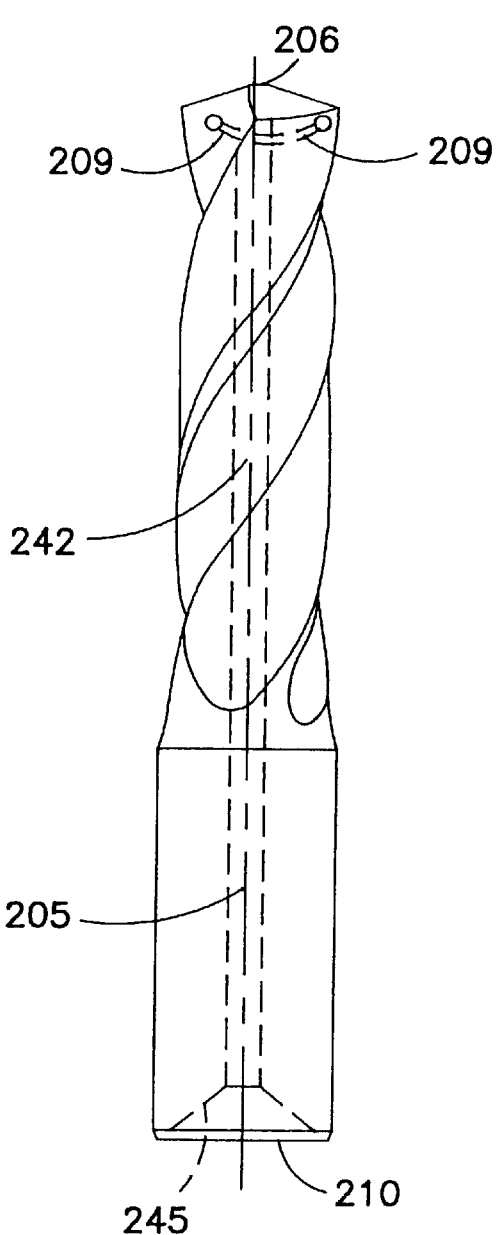
FIGS. 34 and 35 are respective side views of a drill with different coolant channel paths indicated schematically.

In the embodiment illustrated in FIG. 34, there is a central cooling channel 242. This cooling channel 242 follows an axial path and is positioned coaxial to the drill axis 205. In the vicinity of the drill tip 206, the cooling channel 242 can be divided into several branch channels 209. In the vicinity of the end 210 of the shank, the cooling channel 242 has a funnel-shaped inflow opening which improves the flow conditions.

Figure 35:
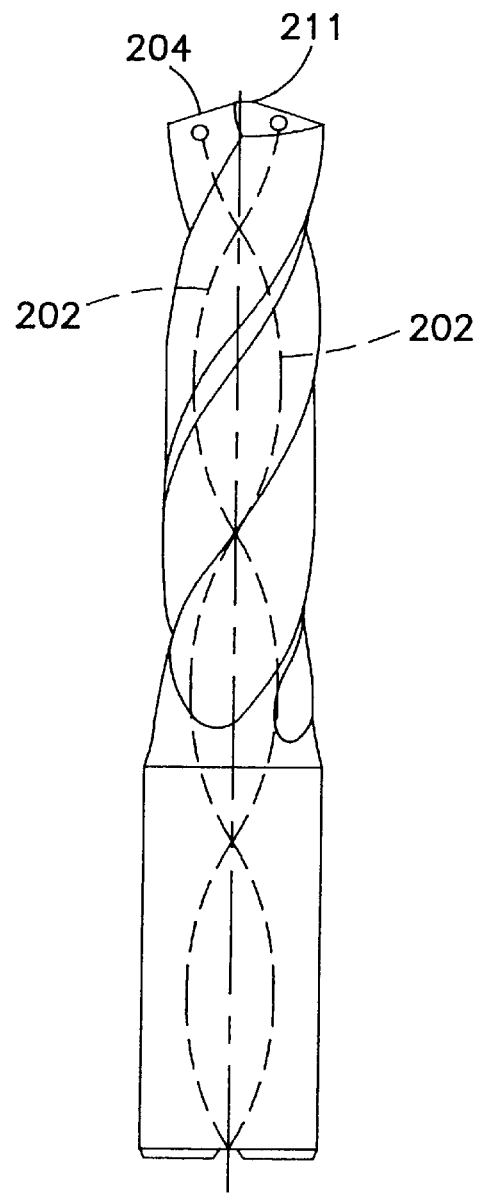

The variant illustrated in FIG. 35 uses twisted cooling channels 202, which cooling channels 202 do not emerge in the end surface of the drill or in the flanks of the major cutting edges 204, but emerge as illustrated in the variants explained with reference to FIGS. 25–33 above.

In another possible embodiment of the present invention, the branch channels 214 leading to the discharge orifices 201, 211, 221 and/or 231 are sized so that no lubricant is discharged at room temperature. The lubricant is discharged only when the drill heats up during operation, thereby causing a reduction in the viscosity of the lubricant.

In yet another possible embodiment, the coolant channel 202 can be filled with a buffer medium, which buffer medium has a somewhat spongy consistency, and makes certain that the lubricant, for example, is discharged only under the action of centrifugal force.

In another possible embodiment of the present invention, the dosing of the lubricant discharge can also be controlled by selecting greases or waxes of different viscosity, which greases can be used to fill the shank of the drill.

In still another possible embodiment of the present invention, a special reservoir container for the lubricant can be used. In this case, too, a measured quantity of lubricant can be discharged from the discharge openings 201, 211, 221 and 231 as a function of the heating of the drill by an appropriate sizing of the branch channels 214 which lead to the discharge openings 201, 211, 221 and 231. As an alternative, it is possible to have the quantity of lubricant discharged controlled as a function of the centrifugal force, in which case there is a valve between the reservoir and the drill shank which is actuated by centrifugal force.

One feature of the invention resides broadly in the drill with a blade 1 which has at least one chip flute 4 which extends in a spiral form around the longitudinal axis 3 of the drill, a drill shank 2 and at least one fluid channel 18, 19 which extends inside the drill in the longitudinal direction of the drill and is used for the feed of lubricant and coolant oil, characterized by the fact that the lateral and peripheral surface of the blade 1 has, in an area in the vicinity of the drill tip 14, at least one discharge orifice 9 which is hydraulically connected to the fluid channel 18, 19, and the flanks 6 of the major cutting edges 5 are free of such discharge orifices.

Another feature of the invention resides broadly in the drill characterized by the fact that the discharge orifice 9 is located in an area which extends from the drill tip 14 toward the drill shank over a distance which equals twice the diameter of the blade.

Yet another feature of the invention resides broadly in the drill characterized by one or more discharge orifices 9 in the chip flute 4.

Still another feature of the invention resides broadly in the drill characterized by one or more discharge orifices 9 in the face 10 of the major cutting edges 5.

A further feature of the invention resides broadly in the drill characterized by the fact that the discharge orifices 9 are located in the area of application of the face 10 which is adjacent to the major cutting edges 5 and is responsible for the chip formation.

Another feature of the invention resides broadly in the drill characterized by the fact that the discharge orifices 9 are located in the area of the face 10 which is immediately adjacent to the minor cutting edge 7.

Yet another feature of the invention resides broadly in the drill characterized by one or more discharge orifices 9 in the back 17 of the chip flute.

Still another feature of the invention resides broadly in the drill characterized by one or more discharge orifices in the minor flank or the land 8.

A further feature of the invention resides broadly in the drill characterized by one or more discharge orifices 9 in the back 11 of the drill.

Another feature of the invention resides broadly in the drill characterized by a central fluid channel 18 which runs coaxial to the longitudinal axis 3 of the drill.

Yet another feature of the invention resides broadly in the drill characterized by the fact that the end surface 23 of the drill shank 2 has a funnel-shaped inflow opening 20 which tapers toward the drill tip 14 and is hydraulically connected to the fluid channel 18.

Still another feature of the invention resides broadly in the drill characterized by the fact that corresponding to each chip flute 4 there is a fluid channel 19 which runs in a spiral form corresponding to the path of the chip flute at least in the vicinity of the blade 1.

A further feature of the invention resides broadly in the drill characterized by the fact that the discharge orifice 9 is connected by means of a connecting channel 13 to the fluid channel 18, 19.

Another feature of the invention resides broadly in the drill characterized by the fact that the connecting channel 13 is formed by a boring.

Yet another feature of the invention resides broadly in the drill characterized by the fact that the spiral-shaped fluid channel 19 emerges by means of a discharge orifice 9d, 9e into the flank 6 of a major cutting edge 5, but the discharge orifice is closed.

Still another feature of the invention resides broadly in the drill characterized by the fact that a plurality of discharge orifices 9 are arranged in a row which extends approximately in the direction of the longitudinal axis 3 of the drill or approximately in the direction of the chip flute.

A further feature of the invention resides broadly in the drill characterized by a plurality of discharge orifices 9 which correspond respectively to a chip flute 4, a land 8 or a drill back 11, whereby the diameter of the discharge orifices 9 and of the corresponding connecting channels 13 decrease as their distance from the drill tip 14 increases.

Another feature of the invention resides broadly in the drill characterized by the fact that the diameter of the fluid channel 18, 19 is greater than the diameter of the connecting channel 13.

Yet another feature of the invention resides broadly in the drill characterized by the fact that the drill is a solid carbide drill.

Still another feature of the invention resides broadly in the drill characterized by the fact that the connecting channel 13 or its central longitudinal axis 21 forms an angle 22 of 75–90 degrees with the longitudinal axis 3 of the drill.

Some examples of drills and related components which may possibly be utilized or adapted for use in the context of the present invention may be disclosed in the following U.S. patent applications: Ser. No. 08/836,326 having inventor Ulrich Krenzer filed on May 9, 1997; Ser. No. 08/849,518 having inventor Ulrich Krenzer filed on Jun. 9, 1997; and Ser. No. 08/836,144 having inventor Ulrich Krenzer filed on Jun. 9, 1997.

Some examples of drills and related components which may possibly be utilized or adapted for use in the context of the present invention may be disclosed in the following U.S. Pat. Nos.: 5,377,773 to Tibbitts on Jan. 3, 1995; 5,380,133 to Schimmer on Jan. 10, 1995; 5,383,751 to Wheetley et al. on Jan. 24, 1995; 5,388,649 to Ilomaki on Feb. 14, 1995; 5,400,546 to Christian et al. on Mar. 28, 1995; 5,415,500 to Delangis et al. on May 16, 1995; 5,417,296 to Murdock on May 23, 1995; 5,421,423 to Huffstutler on Jun. 16, 1995; 5,425,288 to Evans on Jun. 20, 1995; 5,433,279 to Tessari et al. on Jul. 18, 1995; 5,441,119 to Head on Aug. 15, 1995; 5,442,979 to Hsu on Aug. 22, 1995; 5,449,047 to Schivley, Jr. on Sep. 12, 1995; 5,452,971 to Nevills on Sep. 26, 1995; 5,458,210 to Sollami on Oct. 17, 1995; 5,469,926 to Lessard on Nov. 28, 1995; and 5,474,139 to Odendahl et al. on Dec. 12, 1995.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein, and the references cited in any of the documents cited herein, are hereby incorporated by reference as if set forth in their entirety herein.

The corresponding foreign and international patent publication applications, namely, Federal Republic of Germany Patent Application No. 295 11 430.4, filed on Jul. 14, 1995, Federal Republic of Germany Patent Application No. 295 12 745.7, filed on Aug. 8, 1995, Federal Republic of Germany Patent Application No. 296 02 997.1, filed on Feb. 21, 1996, and International Application No. PCT/EP96/03083, filed on Jul. 13, 1996 having inventors Dirk Kammermeier and Bernhard Borschert, and DE-OS 295 11 430.4, DE-OS 295 12 745.71, DE-OS 296 02 997.1, DE-PS 295 11 430.4, DE-PS 295 12 745.7, DE-PS 296 02 997.1 and International Application No. PCT/EP96/03083, filed on August Jul. 13, 1996, which was published as WO 97/03792 on Feb. 6, 1997, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A drill having a longitudinal axis, said drill comprising:

a blade;

said blade comprising a first portion and a second portion;

said first portion of said blade comprising a drill tip;

said drill tip being disposed adjacent to an end of said blade;

said drill tip being configured and disposed to drill a hole in a material to be drilled having a solid surface;

said drill tip being substantially cone-shaped;

said drill tip having a base portion and a tip portion;

said base portion being substantially wider than said tip portion;

said base portion being disposed on an end of said drill tip immediately adjacent said second portion of said blade;

said tip portion being disposed on an end of said drill tip opposite said base portion;

said tip portion comprising a drill point disposed along the longitudinal axis of said drill;

said second portion of said blade comprising at least one chip flute;

said at least one chip flute being configured and disposed to remove chips generated by said drill tip;

said at least one chip flute being configured and disposed about the longitudinal axis of said drill;

at least one channel being configured to permit passage of a fluid through said drill;

said at least one channel being configured and disposed to extend within said drill in a substantially longitudinal direction;

said blade comprising at least one orifice to discharge a fluid supplied by said at least one channel;

said at least one orifice being connected to said at least one channel;

said at least one orifice being configured and disposed at said at least one chip flute;

said drill is a twist drill;

said at least one orifice being disposed solely on said second portion of said blade and not on said drill tip;

said at least one orifice being disposed adjacent to said drill tip;

said blade has a substantially cylindrical shape;

said substantially cylindrical shape of said blade has a diameter;

said second portion of said blade comprises a segment;

said at least one orifice is disposed on said segment of said second portion of said blade;

said segment of said second portion of said blade is configured and disposed to extend from said drill tip for a length of about twice the diameter of said blade in a substantially longitudinal direction;

a shank;

said shank is disposed substantially adjacent to said second portion of said blade;

said at least one chip flute is configured and disposed to spiral about the longitudinal axis of said drill;

said drill tip comprises at least one edge;

said at least one edge is configured and disposed to extend from said drill point toward said second portion of said blade;

said first portion of said blade comprises at least one flank surface;

said at least one flank surface is disposed adjacent to said at least one edge;

said at least one flank surface is configured and disposed to extend from said drill point towards said second portion of said blade;

said at least one edge is at least one first edge;

said second portion of said blade comprises at least one second edge;

said at least one second edge is configured and disposed to spiral about the longitudinal axis from said at least one first edge adjacent to said at least one chip flute;

said second portion of said blade comprises at least one surface;

said at least one surface is configured and disposed to extend in a spiral from said at least one flank surface adjacent to said at least one chip flute;

said at least one surface comprises a land;

said at least one second edge is disposed on said land;

said second portion of said blade comprises at least one connecting channel;

said at least one connecting channel is configured and disposed to connect said at least one orifice to said at least one fluid channel;

said at least one connecting channel is formed by a boring;

said at least one orifice comprises a plurality of orifices;

said at least one connecting channel comprises a plurality of connecting channels;

each of said plurality of connecting channels is connected to a corresponding one of said plurality of orifices;

each of said plurality of connecting channels and each of said plurality of orifices are configured to have a smaller diameter upon said plurality of connecting channels and said plurality of orifices being disposed a greater distance from said drill tip;

each of said plurality of connecting channels has a central axis; and the central axis of each of said plurality of connecting channels is disposed to form an angle of about 75 to 90 degrees with the longitudinal axis of said drill.

2. A drill having a longitudinal axis, said drill comprising:

a blade;

said blade comprising a first portion and a second portion;

said first portion of said blade comprising a drill tip;

said drill tip being disposed adjacent to an end of said blade;

said drill tip being configured and disposed to drill a hole in a material to be drilled having a solid surface;

said drill tip being substantially cone-shaped;

said drill tip having a base portion and a tip portion;

said base portion being substantially wider than said tip portion;

said base portion being disposed on an end of said drill tip immediately adjacent said second portion of said blade;

said tip portion being disposed on an end of said drill tip opposite said base portion;

said tip portion comprising a drill point disposed along the longitudinal axis of said drill;

said second portion of said blade comprising at least one chip flute;

said at least one chip flute being configured and disposed to remove chips generated by said drill tip;

said at least one chip flute being configured and disposed about the longitudinal axis of said drill;

at least one channel being configured to permit passage of a fluid through said drill;

said at least one channel being configured and disposed to extend within said drill in a substantially longitudinal direction;

said blade comprising at least one orifice to discharge a fluid supplied by said at least one channel;

said at least one orifice being connected to said at least one channel;

said at least one orifice being configured and disposed at said at least one chip flute;

said drill is a twist drill;

said at least one orifice being disposed solely on said second portion of said blade and not on said drill tip;

said at least one orifice being disposed adjacent to said drill tip;

said blade has a substantially cylindrical shape;

said substantially cylindrical shape of said blade has a diameter;

said second portion of said blade comprises a segment;

said at least one orifice is disposed on said segment of said second portion of said blade;

said segment of said second portion of said blade is configured and disposed to extend from said drill tip for a length of about twice the diameter of said blade in a substantially longitudinal direction;

a shank;

said shank is disposed substantially adjacent to said second portion of said blade;

said at least one chip flute is configured and disposed to spiral about the longitudinal axis of said drill;

said drill tip comprises at least one edge;

said at least one edge is configured and disposed to extend from said drill point toward said second portion of said blade;

said first portion of said blade comprises at least one flank surface;

said at least one flank surface is disposed adjacent to said at least one edge;

said at least one flank surface is configured and disposed to extend from said drill point towards said second portion of said blade;

said at least one edge is at least one first edge;

said second portion of said blade comprises at least one second edge;

said at least one second edge is configured and disposed to spiral about the longitudinal axis from said at least one first edge adjacent to said at least one chip flute;

said second portion of said blade comprises at least one surface;

said at least one surface is configured and disposed to extend in a spiral from said at least one flank surface adjacent to said at least one chip flute;

said at least one surface comprises a land;

said at least one second edge is disposed on said land;

said second portion of said blade comprises at least one connecting channel;

said at least one connecting channel is configured and disposed to connect said at least one orifice to said at least one fluid channel;

said at least one connecting channel is formed by a boring;

said at least one channel has a first diameter;

said at least one orifice comprises a plurality of orifices;

said at least one connecting channel comprises a plurality of connecting channels;

each of said plurality of connecting channels is connected to a corresponding one of said plurality of orifices;

each of said plurality of connecting channels has a second diameter; and the first diameter of said at least one channel is substantially greater than the second diameter of each of said plurality of connecting channels.

3. The drill according to claim 2, wherein:

said at least one channel is one of d) and e):
   d) configured and disposed to extend coaxial to the longitudinal axis of said drill;
      said shank comprises a surface;
      said surface of said shank is disposed opposite to said blade;
      said surface of said shank comprises an opening;
      said opening is configured to be substantially funnel-shaped and tapers towards said drill tip; and
      said opening is connected to said at least one channel; or
   e) configured and disposed to correspond to said at least one chip flute;
      configured and disposed to extend in a spiral about the longitudinal axis in a manner substantially similar to said at least one chip flute;
      said at least one flank surface comprises at least one opening;
      said at least one channel is configured and disposed to connect to said at least one opening in said at least one flank surface; and
      said drill tip comprises an arrangement configured and disposed to seal said at least one opening on said at least one flank surface.

4. The drill according to claim 3, wherein:

said plurality of orifices are disposed in a row;

said row of orifices are configured and disposed to extend one of a) and b):
   a) substantially parallel to the longitudinal axis; or
   b) substantially spirally along said at least one chip flute;

said at least one chip flute comprises a first surface and a second surface disposed opposite to said first surface;

said first surface of said at least one chip flute is configured and disposed to extend from said at least one first edge in a substantially longitudinal direction; and said second surface of said at least one chip flute is configured and disposed to extend from said at least one flank surface in a substantially longitudinal direction.

5. The drill according to claim 4, wherein:

said plurality of orifices are disposed on said first surface of said of said at least one chip flute;

said drill is a solid carbide drill;

said first surface of said at least one chip flute is configured to form chips upon said drill tip drilling a hole in a material to be drilled; and said plurality of orifices are disposed on said first surface of said at least one chip flute substantially adjacent to said at least one second edge.

6. The drill according to claim 4, wherein:

said at least one orifice is disposed on said second surface of said at least one chip flute; and said drill is a solid carbide drill.

7. Drill with a blade, the blade has at least one chip flute and the at least one chip flute extends in a spiral form around a longitudinal axis of the drill, a drill shank and at least one fluid channel, the at least one fluid channel extends inside the drill in the longitudinal direction of the drill and is used for the feed of lubricant and coolant oil, the blade comprises a drill tip, the drill tip is configured and disposed to drill a hole in a material to be drilled, the drill tip is substantially cone-shaped with a base portion and a tip portion, the base portion is substantially wider than the tip portion, the base portion is disposed immediately adjacent the at least one chip flute, the tip portion is disposed on an end of the drill tip opposite the base portion, the tip portion comprises a drill point disposed along the longitudinal axis of the drill, in an area adjacent to the drill tip, at least one discharge orifice is disposed in the at least one chip flute, and the at least one discharge orifice is hydraulically connected to the at least one fluid channel;

the at least one discharge orifice is located in an area extending from the drill tip toward the drill shank over a distance equal to twice the diameter of the blade;

the at least one discharge orifice is disposed in a rake face adjacent major cutting edges;

the at least one discharge orifice is located in an area of application of the rake face, the rake face is responsible for chip formation; and the at least one discharge orifice is located in an area of the rake face immediately adjacent to a minor cutting edge.

8. Drill with a blade, the blade has at least one chip flute and the at least one chip flute extends in a spiral form around a longitudinal axis of the drill, a drill shank and at least one fluid channel, the at least one fluid channel extends inside the drill in the longitudinal direction of the drill and is used for the feed of lubricant and coolant oil, the blade comprises a drill tip, the drill tip is configured and disposed to drill a hole in a material to be drilled, the drill tip is substantially cone-shaped with a base portion and a tip portion, the base portion is substantially wider than the tip portion, the base portion is disposed immediately adjacent the at least one chip flute, the tip portion is disposed on an end of the drill tip opposite the base portion, the tip portion comprises a drill point disposed along the longitudinal axis of the drill, in an area adjacent to the drill tip, at least one discharge orifice is disposed in the at least one chip flute, and the at least one discharge orifice is hydraulically connected to the at least one fluid channel;

the at least one discharge orifice is located in an area extending from the drill tip toward the drill shank over a distance equal to twice the diameter of the blade;

the at least one discharge orifice is disposed in a back of the at least one chip flute;

the at least one fluid channel corresponds to each at least one chip flute, the at least one fluid channel runs in a spiral form corresponding to the path of the at least one chip flute at least adjacent to the blade; and the at least one spiral-shaped fluid channel emerges by means of a discharge orifice into the flank of the major cutting edge, but the discharge orifice is closed.

9. Drill with a blade, the blade has at least one chip flute and the at least one chip flute extends in a spiral form around a longitudinal axis of the drill, a drill shank and at least one fluid channel, the at least one fluid channel extends inside the drill in the longitudinal direction of the drill and is used for the feed of lubricant and coolant oil, the blade comprises a drill tip, the drill tip is configured and disposed to drill a hole in a material to be drilled, the drill tip is substantially cone-shaped with a base portion and a tip portion, the base portion is substantially wider than the tip portion, the base portion is disposed immediately adjacent the at least one chip flute, the tip portion is disposed on an end of the drill tip opposite the base portion, the tip portion comprises a drill point disposed along the longitudinal axis of the drill, in an area adjacent to the drill tip, at least one discharge orifice is disposed in the at least one chip flute, and the at least one discharge orifice is hydraulically connected to the at least one fluid channel;

- the at least one discharge orifice is located in an area extending from the drill tip toward the drill shank over a distance equal to twice the diameter of the blade;
- the drill is a solid carbide drill;
- said blade comprises at least one surface;
- said at least one surface is configured and disposed to extend in a spiral from the flank adjacent to said at least one chip flute;
- said at least one surface comprises said minor flank and said land;
- the at least one fluid channel runs coaxial to the longitudinal axis of the drill;
- an end surface of the drill shank has a funnel-shaped inflow opening, the inflow opening tapers toward the drill tip and is hydraulically connected to the at least one fluid channel;
- the at least one discharge orifice is connected by a connecting channel to the at least one fluid channel;
- the connecting channel is formed by a boring;
- the at least one discharge orifice comprises a plurality of discharge orifices;
- the plurality of discharge orifices are arranged in a row extending one of approximately in the direction of the longitudinal axis of the drill and approximately in the direction of the at least one chip flute;
- the plurality of discharge orifices correspond to the at least one chip flute, whereby the diameter of the plurality of discharge orifices and of the corresponding connecting channels decrease as their distance from the drill tip increases;
- the diameter of the at least one fluid channel is greater than the diameter of the connecting channel; and
- one of the connecting channel and the central longitudinal axis of the connecting channel forms an angle of 75–90 degrees with the longitudinal axis of the drill.

* * * * *

UNITED STATES PATENT AND TRADEMARK OFFICE
CERTIFICATE OF CORRECTION

PATENT NO. : 6,045,301
DATED : April 4, 2000
INVENTOR(S) : Dirk KAMMERMEIER and Bernhard BORSCHERT It is certified that error appears in the above-indentified patent and that said Letters Patent is hereby corrected as shown below:

In column 8, line 35, after 'fluid' delete "94".

Signed and Sealed this

Third Day of April, 2001

*Attest:*

NICHOLAS P. GODICI

*Attesting Officer*     *Acting Director of the United States Patent and Trademark Office*